United States Patent
Chen

(10) Patent No.: US 9,606,328 B2
(45) Date of Patent: Mar. 28, 2017

(54) PHOTOGRAPHING OPTICAL LENS ASSEMBLY, IMAGE CAPTURING UNIT AND ELECTRONIC DEVICE

(71) Applicant: LARGAN Precision Co., Ltd., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/838,080

(22) Filed: Aug. 27, 2015

(65) Prior Publication Data

US 2017/0003482 A1    Jan. 5, 2017

(30) Foreign Application Priority Data

Jul. 1, 2015    (TW) .............................. 104121339 A

(51) Int. Cl.
G02B 9/64    (2006.01)
G02B 13/00    (2006.01)
H04N 5/225    (2006.01)

(52) U.S. Cl.
CPC ........... *G02B 13/0045* (2013.01); *G02B 9/64* (2013.01); *H04N 5/225* (2013.01)

(58) Field of Classification Search
CPC .............................. G02B 9/64; G02B 13/0045
USPC ........................................ 359/708, 754, 755
See application file for complete search history.

(56) References Cited

U.S. PATENT DOCUMENTS

| | | | |
|---|---|---|---|
| 8,599,495 B1 | 12/2013 | Tsai et al. | |
| 8,736,979 B2 | 5/2014 | Tsai et al. | |
| 2014/0139719 A1 | 5/2014 | Fukaya | |
| 2014/0211324 A1 | 7/2014 | Ishizaka | |
| 2014/0376105 A1 | 12/2014 | Sekine | |
| 2015/0070783 A1 | 3/2015 | Hashimoto | |
| 2015/0103414 A1* | 4/2015 | Baik | G02B 9/64 359/708 |
| 2016/0033742 A1* | 2/2016 | Huang | G02B 13/002 359/708 |
| 2016/0109687 A1* | 4/2016 | Son | G02B 13/04 348/294 |

FOREIGN PATENT DOCUMENTS

| | | |
|---|---|---|
| CN | 203673137 U | 6/2014 |
| CN | 203965708 U | 11/2014 |
| CN | 204065534 U | 12/2014 |
| CN | 204065539 U | 12/2014 |
| CN | 204188865 U | 3/2015 |

(Continued)

*Primary Examiner* — Darryl J Collins
(74) *Attorney, Agent, or Firm* — Maschoff Brennan

(57) ABSTRACT

A photographing optical lens assembly includes, in order from an object side to an image side, a first lens element, a second lens element, a third lens element, a fourth lens element, a fifth lens element, a sixth lens element and a seventh lens element. The second lens element has positive refractive power. The sixth lens element has both of an object-side surface and an image-side surface being aspheric. The seventh lens element has an image-side surface being concave in a paraxial region thereof, wherein the image-side surface of the seventh lens element has at least one convex shape in an off-axis region thereof, and both of an object-side surface and the image-side surface are aspheric.

20 Claims, 19 Drawing Sheets

(56) References Cited

FOREIGN PATENT DOCUMENTS

| | | |
|---|---|---|
| CN | 204188870 U | 3/2015 |
| CN | 204314533 U | 5/2015 |
| JP | 2012-155223 A | 8/2012 |
| JP | 2015-072402 A | 4/2015 |
| JP | 2015-072403 A | 4/2015 |
| JP | 2015-072404 A | 4/2015 |
| JP | 2015-072405 A | 4/2015 |
| JP | 2015-203792 A1 | 11/2015 |
| WO | 2015-159721 A1 | 10/2015 |

* cited by examiner

PHOTOGRAPHING OPTICAL LENS ASSEMBLY, IMAGE CAPTURING UNIT AND ELECTRONIC DEVICE

RELATED APPLICATIONS

This application claims priority to Taiwan Application 104121339, filed Jul. 1, 2015, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a lens structure with less lens elements. Due to the popularity of mobile terminals with high-end specifications, such as smart phones, tablet personal computers, wearable apparatuses and car cameras, the requirements for high resolution and image quality of present compact optical systems increase significantly. However, the conventional optical systems cannot satisfy these requirements of the compact optical systems.

Other conventional optical systems with traditional arrangements of the lens elements are developed to provide wide field of view and sufficient incident light for improving the image quality, but are unable to satisfy the requirement of compact size. Therefore, the conventional optical systems cannot simultaneously satisfy these requirements of high image quality and compact size that are needed for the present compact optical systems.

SUMMARY

According to one aspect of the present disclosure, a photographing optical lens assembly includes, in order from an object side to an image side, a first lens element, a second lens element, a third lens element, a fourth lens element, a fifth lens element, a sixth lens element and a seventh lens element. The second lens element has positive refractive power. The sixth lens element has both of an object-side surface and an image-side surface being aspheric. The seventh lens element has an image-side surface being concave in a paraxial region thereof, wherein the image-side surface of the seventh lens element has at least one convex shape in an off-axis region thereof, and both of an object-side surface and the image-side surface of the seventh lens element are aspheric. The photographing optical lens assembly has a total of seven lens elements. The first lens element, the second lens element, the third lens element, the fourth lens element, the fifth lens element, the sixth lens element and the seventh lens element are all single and non-cemented lens elements. When a curvature radius of the image-side surface of the sixth lens element is R12, a curvature radius of the image-side surface of the seventh lens element is R14, a focal length of the photographing optical lens assembly is f, a focal length of the first lens element is f1, a focal length of the second lens element is f2, an axial distance between an object-side surface of the first lens element and an image surface is TL, a maximum image height of the photographing optical lens assembly is ImgH, the following conditions are satisfied:

$$0 \leq R12/f;$$

$$f2/|f1|<1.5;$$

$$R14/f<0.75; \text{ and}$$

$$TL/ImgH<3.0.$$

According to another aspect of the present disclosure, an image capturing unit includes an image sensor and the aforementioned photographing optical lens assembly, wherein the image sensor is disposed on the image side of the photographing optical lens assembly.

According to still another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

A photographing optical lens assembly includes, in order from an object side to an image side, a first lens element, a second lens element, a third lens element, a fourth lens element, a fifth lens element, a sixth lens element and a seventh lens element. The photographing optical lens assembly has a total of seven lens elements.

According to the present disclosure, there is an air gap in a paraxial region arranged between every two of the first lens element, the second lens element, the third lens element, the fourth lens element, the fifth lens element, the sixth lens element and the seventh lens element that are adjacent to each other. That is, each of the first through seventh lens elements of the photographing optical lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the lens system. Therefore, the single and non-cemented lens element in the present disclosure is favorable for solving the problem generated by the cemented lens elements.

The first lens element has refractive power. Therefore, it is favorable for correcting the aberration so as to improve the image quality.

The second lens element has positive refractive power. Therefore, it is favorable for reducing a total track length of the photographing optical lens assembly.

The third lens element can have negative refractive power. Therefore, it is favorable for correcting the aberration from the second lens element and reducing the sensitivity of the photographing optical lens assembly.

Figure 17:
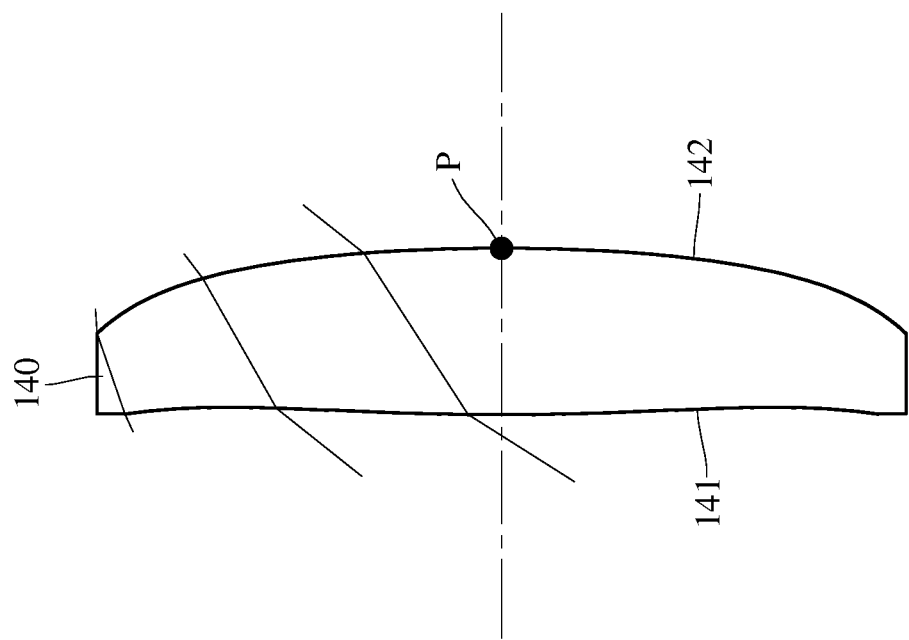
FIG. 17 is a schematic view of a reference point located at a center of an image-side surface of a fourth lens element in FIG. 1.

The fourth lens element can have positive refractive power. The fourth lens element can have an image-side surface being convex in a paraxial region thereof. In addition, a center of the image-side surface of the fourth lens element can be the point closest to an image surface on the image-side surface of the fourth lens element. As seen in FIG. 17, which shows a schematic view of a reference point located at a center of an image-side surface of a fourth lens element in FIG. 1. In FIG. 17, a reference point P at the image-side surface of the fourth lens element is the center of the image-side surface of the fourth lens element. The reference point P is closer to the image surface than the other reference points (not shown in the drawing) at the image-side surface of the fourth lens element. Therefore, it is favorable for effectively correcting the Petzval sum so as to improve the flatness of the image surface and effectively correct the astigmatism. The center of the image-side surface of the fourth lens element is an intersection of the image-side surface of the fourth lens element and an optical axis.

The fifth lens element has refractive power. Therefore, it is favorable for correcting the astigmatism so as to improve the image quality.

The sixth lens element can have positive refractive power. The sixth lens element can have an image-side surface being concave in a paraxial region thereof, and the image-side surface of the sixth lens element can have at least one convex shape in an off-axis region thereof. Therefore, a shape of the sixth lens element is more proper so that it is favorable for correcting the aberration and distortion at the peripheral region of the image, thereby further improving the image quality The seventh lens element with refractive power can have an object-side surface being convex in a paraxial region thereof. The seventh lens element has an image-side surface being concave in a paraxial region thereof, and the image-side surface of the seventh lens element has at least one convex shape in an off-axis region thereof. Therefore, it is favorable for the principal point of the photographing optical lens assembly being positioned away from the image side of the optical imaging lens system so as to effectively reduce a back focal length of the photographing optical lens assembly, thereby maintaining a compact size thereof.

When a curvature radius of the image-side surface of the sixth lens element is R12, a focal length of the photographing optical lens assembly is f, the following condition is satisfied: $0 \leq R12/f$. Therefore, it is favorable for the principal point of the photographing optical lens assembly being further positioned away from the image side of the optical imaging lens system so as to so as to reduce the total track length of the photographing optical lens assembly.

When a focal length of the first lens element is f1, a focal length of the second lens element is f2, the following condition is satisfied: $f2/|f1|<1.5$. Therefore, the refractive power distribution at the image side of the photographing optical lens assembly is sufficient so that it is favorable for providing wide field of view, low sensitivity and compact size. Preferably, the following condition can also be satisfied: $f2/|f1|<1.0$.

When a curvature radius of the image-side surface of the seventh lens element is R14, the focal length of the photographing optical lens assembly is f, the following condition is satisfied: $R14/f<0.75$. Therefore, the image-side surface of the seventh lens element is favorable for effectively reducing the back focal length of the photographing optical lens assembly so as to maintain a compact size thereof. Preferably, the following condition can also be satisfied: $R14/f<0.60$. More preferably, the following condition can also be satisfied: $R14/f<0.45$.

When an axial distance between an object-side surface of the first lens element and the image surface is TL, a maximum image height (half of a diagonal length of an effective photosensitive area of an image sensor) of the photographing optical lens assembly is ImgH, the following condition is satisfied: $TL/ImgH<3.0$. Therefore, it is favorable for keeping the photographing optical lens assembly compact so as to be equipped in an electronic device.

When a central thickness of the fourth lens element is CT4, a central thickness of the fifth lens element is CT5, the following condition can be satisfied: $1.25<CT4/CT5<4.0$. Therefore, it is favorable for reducing numerous lens molding problems so as to increase the manufacturing yield rate.

When a maximum refractive power among the first lens element, the second lens element, the third lens element, the fourth lens element, the fifth lens element, the sixth lens element and the seventh lens element is Powmax, the following condition can be satisfied: |Powmax|<0.90. Therefore, it is favorable for evenly arranging the refractive powers of the lens elements so as to reduce the sensitivity of the lens elements, thereby increasing the manufacturing yield rate. In detail, a refractive power of a lens element is defined as a ratio of a focal length of the photographing optical lens assembly to a focal length of the lens element.

When a sum of central thicknesses of the first lens element, the second lens element, the third lens element, the fourth lens element, the fifth lens element, the sixth lens element and the seventh lens element is ΣCT, an axial distance between the object-side surface of the first lens element and the image-side surface of the seventh lens element is Td, the following condition can be satisfied: 0.70≤ΣCT/Td<0.95. Therefore, it is favorable for providing the lens elements with proper axial distances and thicknesses so as to increase the manufacturing yield rate and keep the photographing optical lens assembly compact.

When a curvature radius of the object-side surface of the seventh lens element is R13, the curvature radius of the image-side surface of the seventh lens element is R14, the focal length of the photographing optical lens assembly is f, the following condition can be satisfied: (|R13|+|R14|)/f<2.0. Therefore, it is favorable for balancing the curvature radii of the two surfaces of the seventh lens element so as to correct the spherical aberration. In addition, when the object-side surface of the seventh lens element is convex in a paraxial region thereof, it is also favorable for providing the seventh lens element with proper shape so as to improve the capability in the correction of aberration.

When a central thickness of the first lens element is CT1, a central thickness of the second lens element is CT2, the following condition can be satisfied: CT2/CT1<1.60. Therefore, it is favorable for providing the first lens element and the second lens element with proper thicknesses so as to increase the manufacturing yield.

When an axial distance between the object-side surface of the first lens element and an image-side surface of the third lens element is Dr1r6, a central thickness of the fourth lens element is CT4, the following condition can be satisfied: Dr1r6/CT4<2.50. Therefore, it is favorable for tightly arranging the lens elements being close to the object side of the photographing optical lens assembly so as to keep the photographing optical lens assembly compact.

When an Abbe number of the third lens element is V3, an Abbe number of the fifth lens element is V5, the following condition can be satisfied: V3+V5<60. Therefore, it is favorable for correcting the chromatic aberration and the astigmatism.

When the focal length of the photographing optical lens assembly is f, the focal length of the first lens element is f1, the focal length of the second lens element is f2, the following condition can be satisfied: |f/f1|+|f/f2|<1.50. Therefore, it is favorable for evenly arranging the refractive powers of the first lens element and the second lens element so as to reduce the sensitivity of the lens elements being close to the object side of the photographing optical lens assembly.

When an Abbe number of the second lens element is V2, an Abbe number of the third lens element is V3, the following condition can be satisfied: 1.5<V2/V3<3.5, Therefore, it is favorable for correcting the chromatic aberration and the astigmatism.

According to the present disclosure, an aperture stop can be configured as a front stop or a middle stop. A front stop disposed between an imaged object and the first lens element can produce a telecentric effect by providing a longer distance between an exit pupil of the photographing optical lens assembly and the image surface and thereby improving the image-sensing efficiency of an image sensor (for example, CCD or CMOS). A middle stop disposed between the first lens element and the image surface is favorable for enlarging the view angle of the photographing optical lens assembly and thereby provides a wider field of view.

According to the present disclosure, the lens elements of the photographing optical lens assembly can be made of glass or plastic material. When the lens elements are made of glass material, the refractive power distribution of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the photographing optical lens assembly, based on the corresponding image sensor, can be flat or curved, especially a curved surface being concave facing towards the object side of the photographing optical lens assembly.

According to the present disclosure, the photographing optical lens assembly can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the photographing optical lens assembly according to the aforementioned photographing optical lens assembly of the present disclosure, and an image sensor, wherein the image sensor is disposed on the image side of the aforementioned photographing optical lens assembly, that is, the image sensor can be disposed on or near an image surface of the aforementioned photographing optical lens assembly. In some embodiments, the image capturing unit can further include a barrel member, a holding member or a combination thereof.

Figure 19:
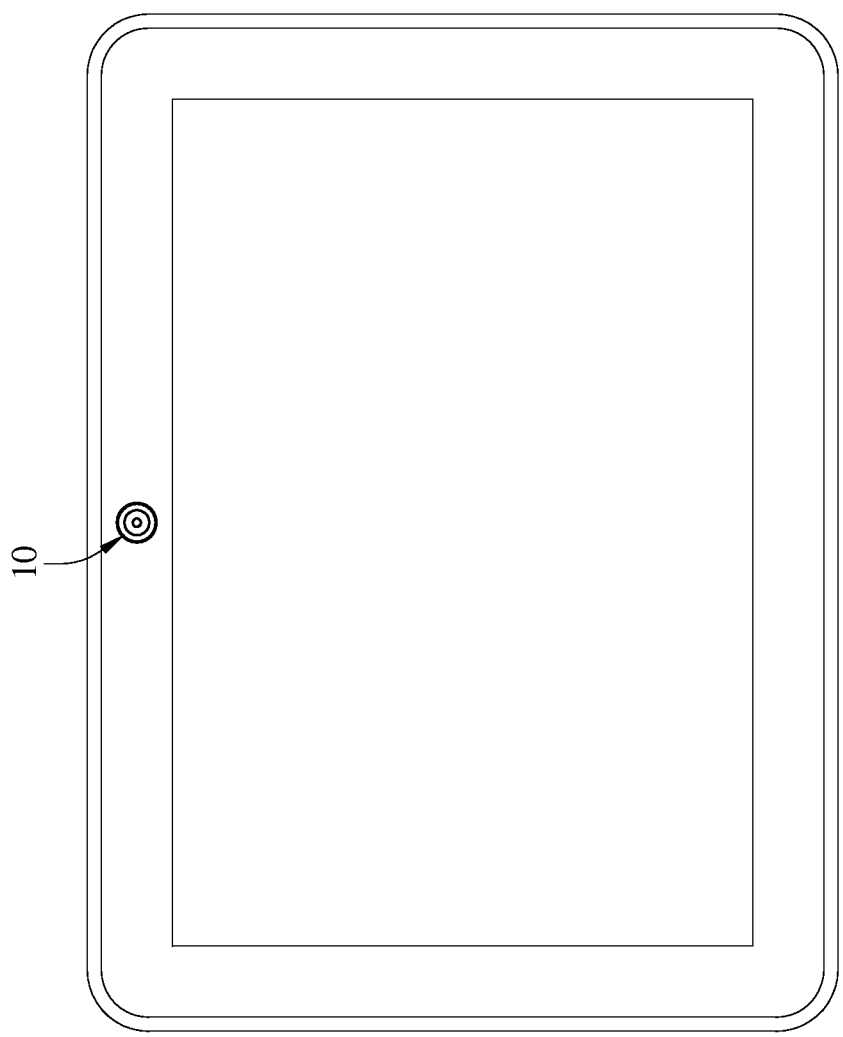
FIG. 19 shows an electronic device according to another embodiment.
Figure 18:
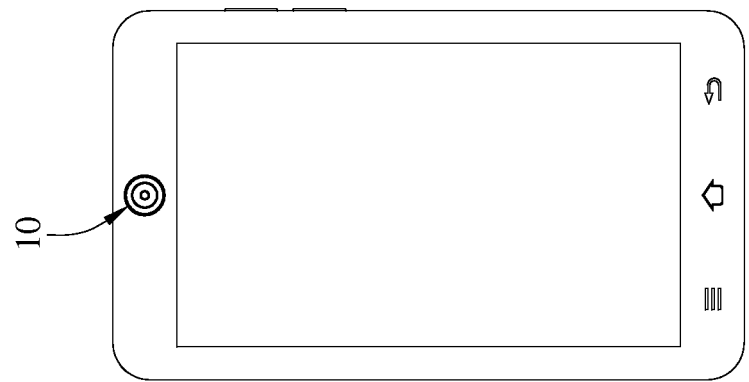
FIG. 18 shows an electronic device according to one embodiment.
Figure 20:
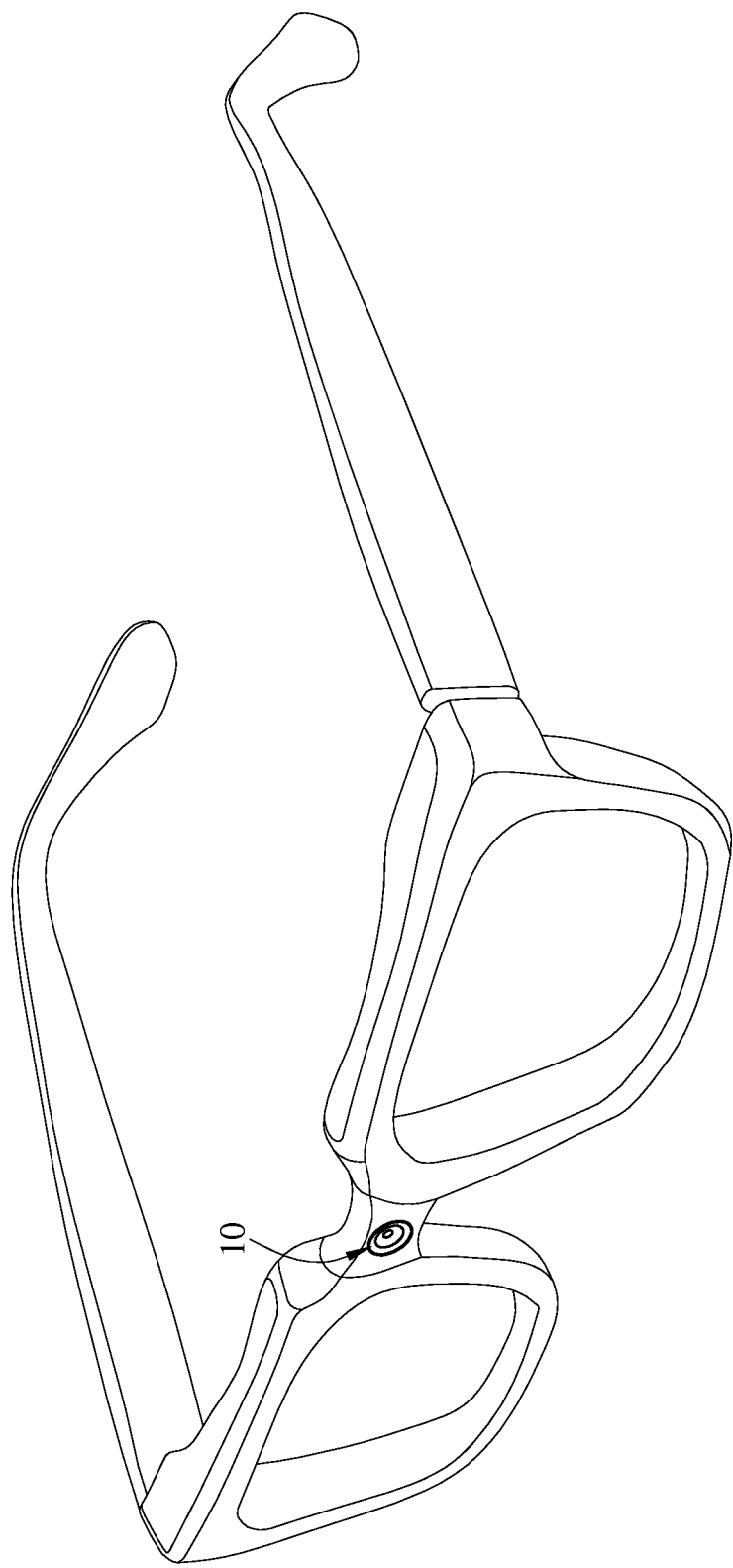
FIG. 20 shows an electronic device according to still another embodiment.

In FIG. 18, FIG. 19, and FIG. 20, an image capturing device 10 may be installed in, but not limited to, an electronic device, including a smart phone (FIG. 18), a tablet personal computer (FIG. 19) or a wearable device (FIG. 20). The electronic devices shown in the figures are only exemplary for showing the image capturing device of present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the photographing optical lens assembly can be optionally applied to optical systems with a movable focus. Furthermore, the photographing optical lens assembly is featured with good capability in the correction of aberration and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 1:
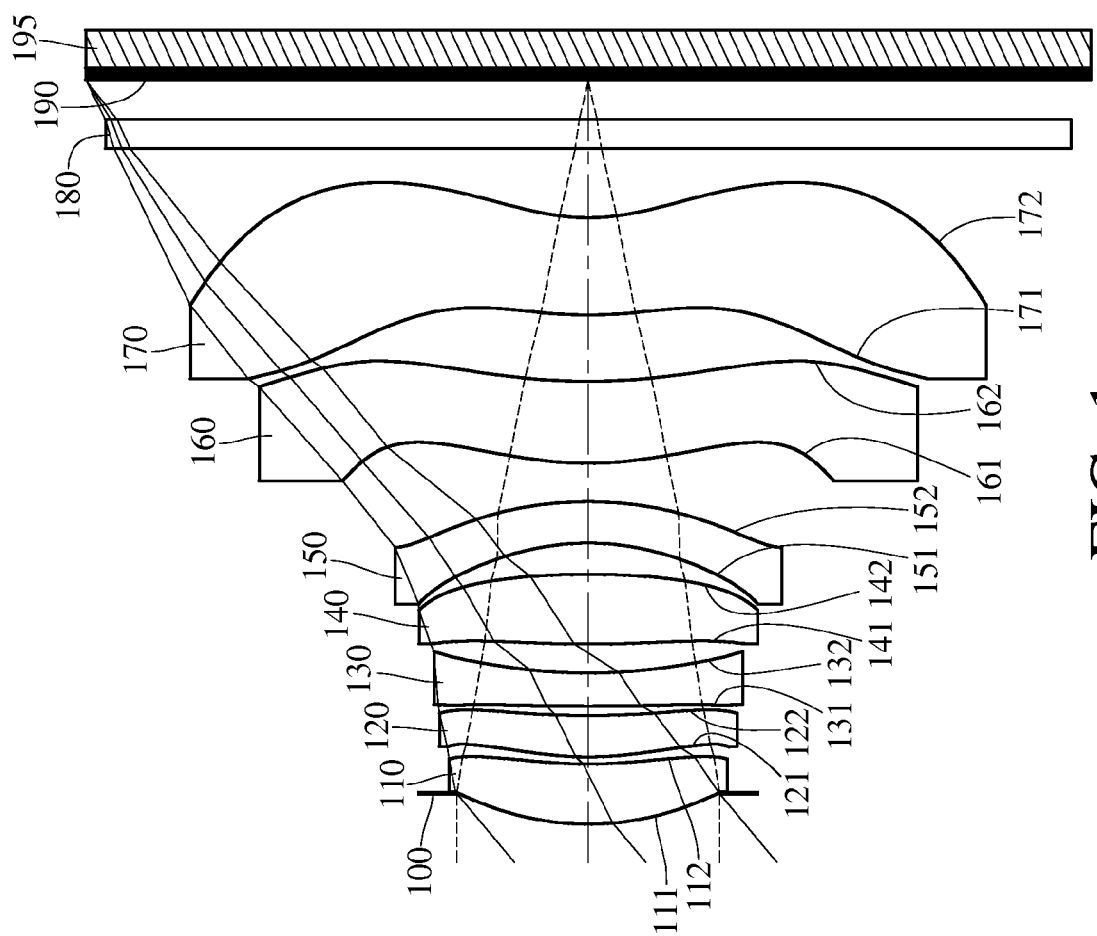
FIG. 1 is a schematic view of an image capturing unit according to the 1st embodiment of the present disclosure.
Figure 2:
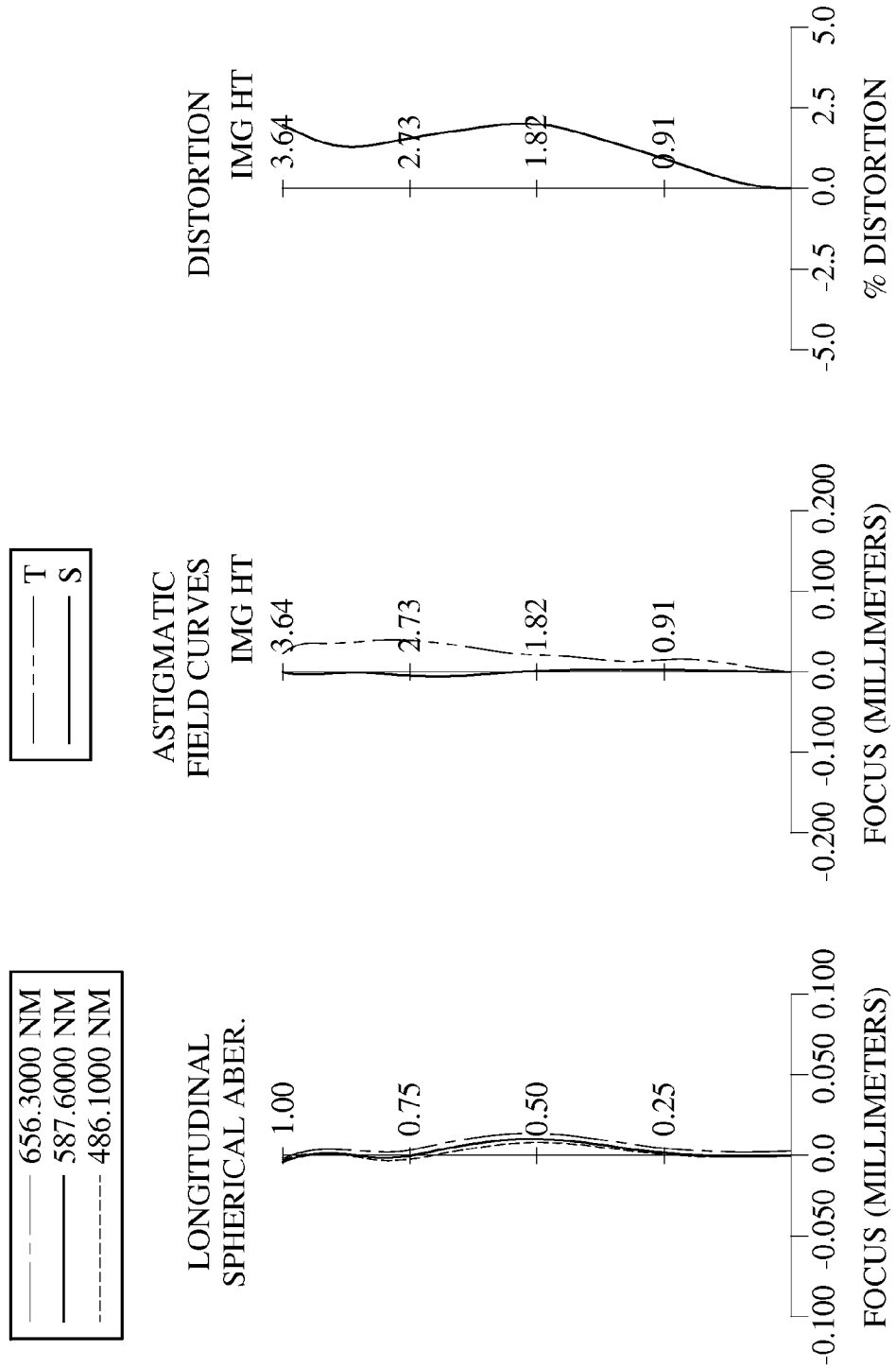
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 195. The photographing optical lens assembly includes, in order from an object side to an image side, an aperture stop 100, a first lens element 110, a second lens element 120, a third lens element 130, a fourth lens element 140, a fifth lens element 150, a sixth lens element 160, a seventh lens element 170, an IR-cut filter 180 and an image surface 190, wherein the photographing optical lens assembly has a total of seven single and non-cemented lens elements (110-170).

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. A center of the image-side surface 142 of the fourth lens element 140 is the point closest to the image surface 190 on the image-side surface 142.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex shape in an off-axis region thereof.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The image-side surface 172 of the seventh lens element 170 has at least one convex shape in an off-axis region thereof.

The IR-cut filter 180 is made of glass and located between the seventh lens element 170 and the image surface 190, and will not affect the focal length of the photographing optical lens assembly. The image sensor 195 is disposed on or near the image surface 190 of the photographing optical lens assembly.

The equation of the aspheric surface profiles of the aforementioned lens elements of the 1st embodiment is expressed as follows:

$$Y(X) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the photographing optical lens assembly of the image capturing unit according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=4.28 millimeters (mm); Fno=2.25; and HFOV=39.8 degrees (deg.).

When an Abbe number of the second lens element 120 is V2, an Abbe number of the third lens element 130 is V3, the following condition is satisfied: V2/V3=2.38.

When the Abbe number of the third lens element 130 is V3, an Abbe number of the fifth lens element 150 is V5, the following condition is satisfied: V3+V5=47.0.

When a central thickness of the first lens element 110 is CT1, a central thickness of the second lens element 120 is CT2, the following condition is satisfied: CT2/CT1=0.69.

When a central thickness of the fourth lens element 140 is CT4, a central thickness of the fifth lens element 150 is CT5, the following condition is satisfied: CT4/CT5=1.69.

When a sum of central thicknesses of the first lens element 110, the second lens element 120, the third lens element 130, the fourth lens element 140, the fifth lens element 150, the sixth lens element 160 and the seventh lens element 170 is ΣCT, an axial distance between the object-side surface 111 of the first lens element 110 and the image-side surface 172 of the seventh lens element 170 is Td, the following condition is satisfied: ΣCT/Td=0.70.

When an axial distance between the object-side surface 111 of the first lens element 110 and the image-side surface 132 of the third lens element 130 is Dr1r6, the central thickness of the fourth lens element 140 is CT4, the following condition is satisfied: Dr1r6/CT4=2.17.

When a focal length of the first lens element 110 is f1, a focal length of the second lens element 120 is f2, the following condition is satisfied: f2/|f1|=0.61.

When a curvature radius of the image-side surface 162 of the sixth lens element 160 is R12, the focal length of the photographing optical lens assembly is f, the following condition is satisfied: R12/f=0.97.

When a curvature radius of the object-side surface 171 of the seventh lens element 170 is R13, a curvature radius of the image-side surface 172 of the seventh lens element 170 is R14, the focal length of the photographing optical lens assembly is f, the following condition is satisfied: (|R13|+|R14|)/f=0.99.

When the curvature radius of the image-side surface 172 of the seventh lens element 170 is R14, the focal length of the photographing optical lens assembly is f, the following condition is satisfied: R14/f=0.35.

When an axial distance between the object-side surface 111 of the first lens element 110 and the image surface 190 is TL, a maximum image height of the photographing optical lens assembly is ImgH, the following condition is satisfied: TL/ImgH=1.48.

When the focal length of the photographing optical lens assembly is f, the focal length of the first lens element 110 is f1, the focal length of the second lens element 120 is f2, the following condition is satisfied: |f/f1|+|f/f2|=1.12.

When a maximum refractive power among the first lens element 110, the second lens element 120, the third lens element 130, the fourth lens element 140, the fifth lens element 150, the sixth lens element 160 and the seventh lens element 170 is Powmax, the following condition is satisfied: |Powmax|=0.70.

The detailed optical data of the 1st embodiment are shown in Table 1 and the aspheric surface data are shown in Table 2 below.

TABLE 1

1st Embodiment
f = 4.28 mm, Fno = 2.25, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.222 | | | | |
| 2 | Lens 1 | 2.001 | (ASP) | 0.435 | Plastic | 1.544 | 55.9 | 10.13 |
| 3 | | 2.901 | (ASP) | 0.052 | | | | |
| 4 | Lens 2 | 2.225 | (ASP) | 0.300 | Plastic | 1.544 | 55.9 | 6.13 |
| 5 | | 6.371 | (ASP) | 0.069 | | | | |
| 6 | Lens 3 | 18.095 | (ASP) | 0.240 | Plastic | 1.639 | 23.5 | −7.31 |
| 7 | | 3.695 | (ASP) | 0.210 | | | | |
| 8 | Lens 4 | 7.946 | (ASP) | 0.506 | Plastic | 1.544 | 55.9 | 6.57 |
| 9 | | −6.350 | (ASP) | 0.227 | | | | |
| 10 | Lens 5 | −1.891 | (ASP) | 0.300 | Plastic | 1.639 | 23.5 | −9.69 |
| 11 | | −2.890 | (ASP) | 0.280 | | | | |
| 12 | Lens 6 | 2.599 | (ASP) | 0.594 | Plastic | 1.544 | 55.9 | 11.20 |
| 13 | | 4.168 | (ASP) | 0.481 | | | | |
| 14 | Lens 7 | 2.716 | (ASP) | 0.707 | Plastic | 1.544 | 55.9 | −7.91 |
| 15 | | 1.512 | (ASP) | 0.500 | | | | |
| 16 | IR-cut filter | Plano | | 0.210 | Glass | 1.517 | 64.2 | — |
| 17 | | Plano | | 0.289 | | | | |
| 18 | Image | Plano | | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −5.9908E−01 | −3.0097E+01 | −1.1452E+01 | 2.0535E+01 | −5.9339E+01 |
| A4 = | −5.7862E−03 | −9.1706E−02 | −1.0524E−01 | 4.6961E−04 | 5.4930E−03 |
| A6 = | 1.3940E−02 | 8.5755E−02 | 1.0253E−01 | −7.8872E−02 | −2.7424E−02 |
| A8 = | −9.3242E−03 | −7.3114E−02 | −8.7447E−02 | 6.4673E−02 | −2.7639E−02 |
| A10 = | −4.9626E−03 | 4.3889E−02 | 5.0767E−02 | −9.5782E−02 | −3.2934E−03 |
| A12 = | 1.0752E−02 | −3.0365E−02 | −2.7637E−02 | 8.0208E−02 | 6.5789E−02 |
| A14 = | −1.1043E−02 | −4.6505E−03 | −1.4122E−02 | −3.0362E−02 | −3.1020E−02 |

TABLE 2-continued

Aspheric Coefficients

| Surface # | | | | | |
|---|---|---|---|---|---|
| | 7 | 8 | 9 | 10 | 11 |
| k = | −7.9615E+00 | −9.0000E+01 | 1.4243E+01 | 8.2179E−01 | −2.0625E+00 |
| A4 = | −1.8289E−03 | −2.0934E−02 | −3.5530E−02 | 1.6292E−02 | −7.1984E−02 |
| A6 = | −5.9409E−03 | −9.9628E−03 | 2.3273E−02 | 7.8686E−02 | 7.8810E−02 |
| A8 = | −4.2299E−03 | −2.8477E−03 | −1.8072E−02 | −7.9015E−02 | −5.4664E−02 |
| A10 = | 1.1438E−02 | 4.4138E−04 | −1.4066E−02 | 4.0536E−02 | 2.3319E−02 |
| A12 = | 2.1222E−05 | 1.0473E−03 | 1.8155E−02 | −1.1532E−02 | −5.1940E−03 |
| A14 = | — | — | −8.7767E−03 | 1.0754E−03 | 8.8086E−04 |
| A16 = | — | — | 1.1131E−03 | — | — |

| Surface # | | | | |
|---|---|---|---|---|
| | 12 | 13 | 14 | 15 |
| k = | −8.3233E+00 | −4.7309E+00 | −2.4100E+00 | −3.3664E+00 |
| A4 = | −2.4433E−02 | −1.7888E−02 | −1.8057E−02 | −1.0849E−01 |
| A6 = | 8.9643E−03 | 5.0084E−03 | 5.5651E−02 | 4.4434E−02 |
| A8 = | −1.6391E−02 | −4.6391E−03 | −1.0363E−02 | −1.3274E−02 |
| A10 = | 8.3198E−03 | 1.2156E−03 | 1.4681E−03 | 2.4801E−03 |
| A12 = | −2.6273E−03 | −1.1494E−04 | −1.5026E−04 | −2.7700E−04 |
| A14 = | 3.4067E−04 | 3.0094E−06 | 9.3145E−06 | 1.6704E−05 |
| A16 = | — | — | −2.7170E−07 | −4.1573E−07 |

In Table 1, the curvature radius, the thickness and the focal length are shown in millimeters (mm). Surface numbers 0-18 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
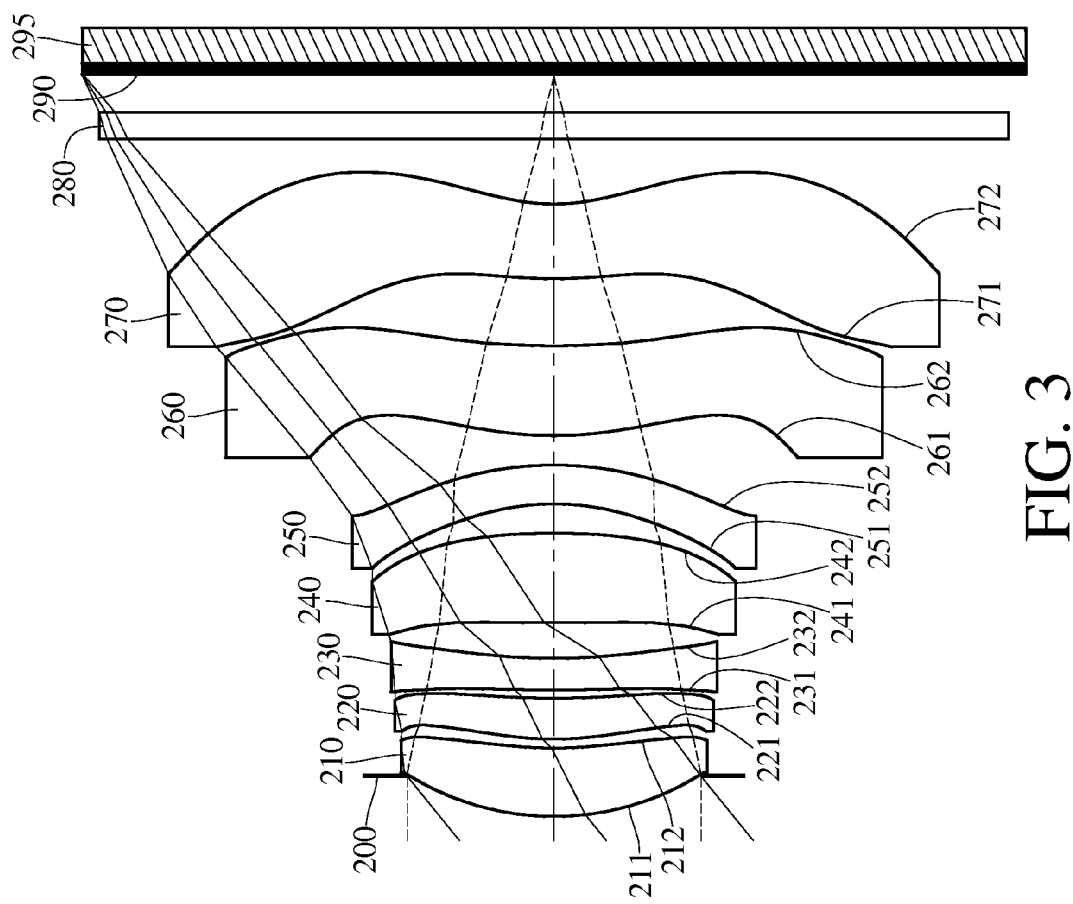
FIG. 3 is a schematic view of an image capturing unit according to the 2nd embodiment of the present disclosure.
Figure 4:
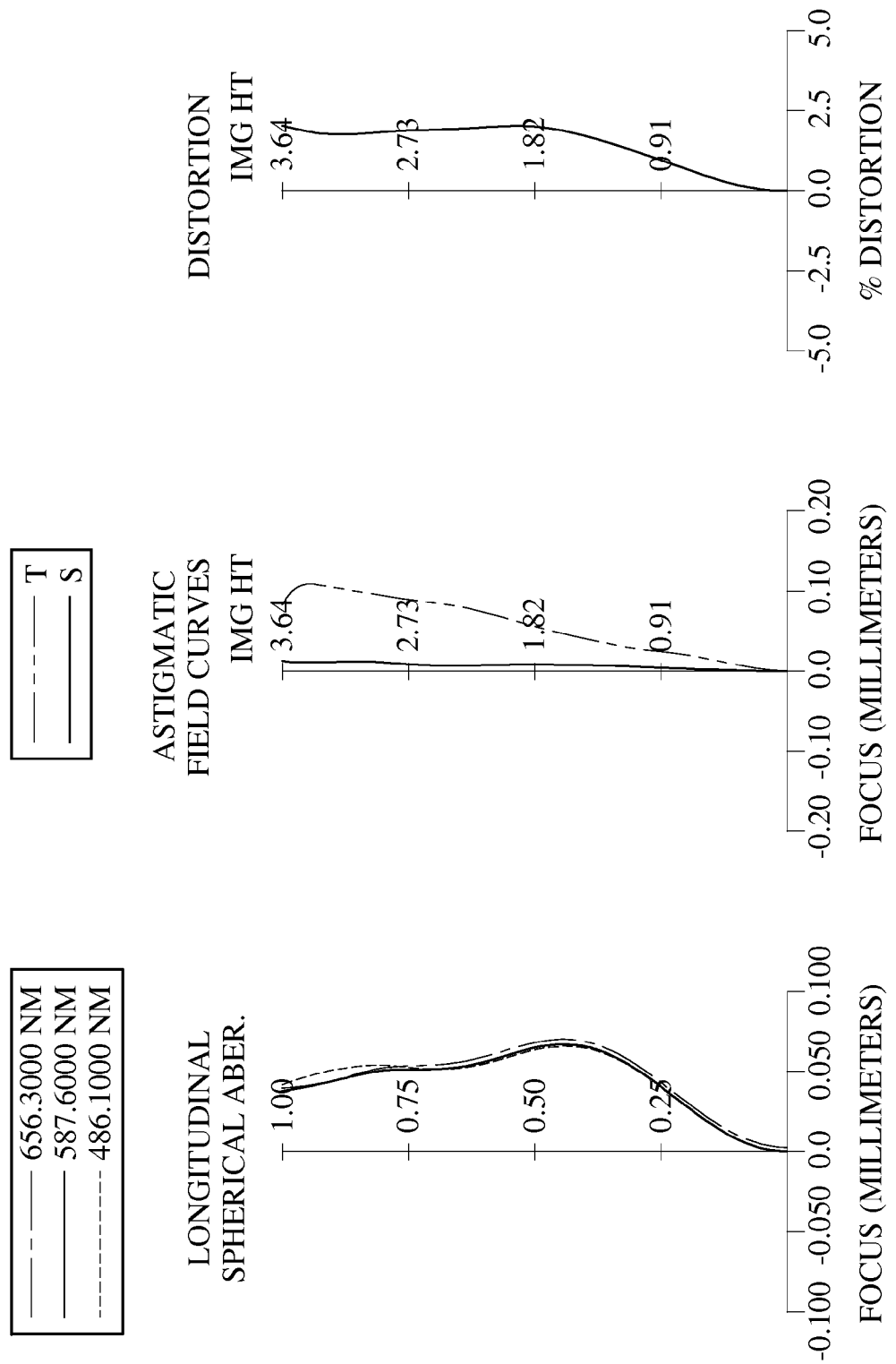
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 295. The photographing optical lens assembly includes, in order from an object side to an image side, an aperture stop 200, a first lens element 210, a second lens element 220, a third lens element 230, a fourth lens element 240, a fifth lens element 250, a sixth lens element 260, a seventh lens element 270, an IR-cut filter 280 and an image surface 290, wherein the photographing optical lens assembly has a total of seven single and non-cemented lens elements (210-270).

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. A center of the image-side surface 242 of the fourth lens element 240 is a point closest to the image surface 290 on the image-side surface 242.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex shape in an off-axis region thereof.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The image-side surface 272 of the seventh lens element 270 has at least one convex shape in an off-axis region thereof.

The IR-cut filter 280 is made of glass and located between the seventh lens element 270 and the image surface 290, and will not affect the focal length of the photographing optical lens assembly. The image sensor 295 is disposed on or near the image surface 290 of the photographing optical lens assembly.

The detailed optical data of the 2nd embodiment are shown in Table 3 and the aspheric surface data are shown in Table 4 below.

TABLE 3

2nd Embodiment
f = 4.38 mm, Fno = 1.93, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.313 | | | | |
| 2 | Lens 1 | 2.110 | (ASP) | 0.528 | Plastic | 1.544 | 55.9 | 11.55 |
| 3 | | 2.895 | (ASP) | 0.069 | | | | |
| 4 | Lens 2 | 2.290 | (ASP) | 0.317 | Plastic | 1.544 | 55.9 | 6.19 |
| 5 | | 6.812 | (ASP) | 0.063 | | | | |
| 6 | Lens 3 | 17.558 | (ASP) | 0.245 | Plastic | 1.661 | 20.4 | −9.63 |
| 7 | | 4.645 | (ASP) | 0.274 | | | | |
| 8 | Lens 4 | 19.454 | (ASP) | 0.693 | Plastic | 1.544 | 55.9 | 8.17 |
| 9 | | −5.689 | (ASP) | 0.226 | | | | |
| 10 | Lens 5 | −1.990 | (ASP) | 0.300 | Plastic | 1.661 | 20.4 | −11.57 |
| 11 | | −2.852 | (ASP) | 0.229 | | | | |
| 12 | Lens 6 | 2.803 | (ASP) | 0.694 | Plastic | 1.544 | 55.9 | 8.39 |
| 13 | | 6.622 | (ASP) | 0.518 | | | | |
| 14 | Lens 7 | 3.260 | (ASP) | 0.578 | Plastic | 1.544 | 55.9 | −5.66 |
| 15 | | 1.484 | (ASP) | 0.500 | | | | |
| 16 | IR-cut filter | Plano | | 0.210 | Glass | 1.517 | 64.2 | — |
| 17 | | Plano | | 0.289 | | | | |
| 18 | Image | Plano | | — | | | | |

Note:
Reference wavelength (d-line) is 587.6 nm.

TABLE 4

Aspheric Coefficients

| | Surface # | | | | |
|---|---|---|---|---|---|
| | 1 | 2 | 4 | 5 | 6 |
| k = | −5.7870E−01 | −1.8073E+01 | −7.1797E+00 | 1.6654E+01 | −7.6998E+01 |
| A4 = | −6.4332E−03 | −8.7705E−02 | −1.2103E−01 | −5.0375E−03 | 6.5598E−03 |
| A6 = | 2.3458E−02 | 8.7885E−02 | 9.9051E−02 | −7.6423E−02 | −2.4943E−02 |
| A8 = | −1.4263E−02 | −6.7379E−02 | −7.4476E−02 | 6.9242E−02 | −3.3675E−02 |
| A10 = | −6.6857E−03 | 5.0181E−02 | 5.7777E−02 | −8.8139E−02 | −9.9625E−03 |
| A12 = | 1.7139E−02 | −2.2358E−02 | −2.3288E−02 | 8.1166E−02 | 6.3471E−02 |
| A14 = | −7.4851E−03 | −1.5296E−03 | −6.1059E−03 | −2.8272E−02 | −2.6926E−02 |

| | Surface # | | | | |
|---|---|---|---|---|---|
| | 7 | 8 | 9 | 10 | 11 |
| k = | −5.8158E+00 | −6.7458E+01 | 1.2405E+01 | 7.3488E−01 | −1.5843E+00 |
| A4 = | −4.2450E−04 | −4.0456E−02 | −4.5868E−02 | 9.6228E−03 | −5.9742E−02 |
| A6 = | −2.6529E−02 | −6.3340E−03 | 2.4828E−02 | 8.0457E−02 | 7.7738E−02 |
| A8 = | 6.3026E−03 | −2.9284E−03 | −1.3828E−02 | −7.7879E−02 | −6.1153E−02 |
| A10 = | 6.6104E−03 | −6.8268E−04 | −1.3357E−02 | 4.1549E−02 | 3.1373E−02 |
| A12 = | −1.6196E−03 | 1.7938E−03 | 1.9774E−02 | −1.0278E−02 | −9.1738E−03 |
| A14 = | — | — | −8.2315E−03 | 9.7767E−04 | 1.2320E−03 |
| A16 = | | | 1.1145E−03 | | |

| | Surface # | | | |
|---|---|---|---|---|
| | 12 | 13 | 14 | 15 |
| k = | −1.0272E+01 | −7.8551E−01 | −1.1158E+00 | −3.7218E+00 |
| A4 = | −5.7377E−03 | 2.1714E−02 | −1.8080E−01 | −1.0719E−01 |
| A6 = | −7.4257E−04 | −1.9921E−02 | 5.5487E−02 | 4.3933E−02 |
| A8 = | −1.2406E−02 | 4.5602E−03 | −1.0378E−02 | −1.3154E−02 |
| A10 = | 6.8824E−03 | −7.1291E−04 | 1.4679E−03 | 2.4808E−03 |
| A12 = | −1.9798E−03 | 8.8713E−05 | −1.5004E−04 | −2.7742E−04 |
| A14 = | 2.2570E−04 | −5.3056E−06 | 9.3589E−06 | 1.6675E−05 |
| A16 = | — | — | −2.7317E−07 | −4.1293E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.38 | Dr1r6/CT4 | 1.76 |
| Fno | 1.93 | f2/|f1| | 0.54 |
| HFOV [deg.] | 38.9 | R12/f | 1.51 |
| V2/V3 | 2.75 | (|R13| + |R14|)/f | 1.08 |
| V3 + V5 | 40.8 | R14/f | 0.34 |
| CT2/CT1 | 0.60 | TL/ImgH | 1.58 |
| CT4/CT5 | 2.31 | |f/f1| + |f/f2| | 1.09 |
| ΣCT/Td | 0.71 | |Powmax| | 0.77 |

3rd Embodiment

Figure 5:
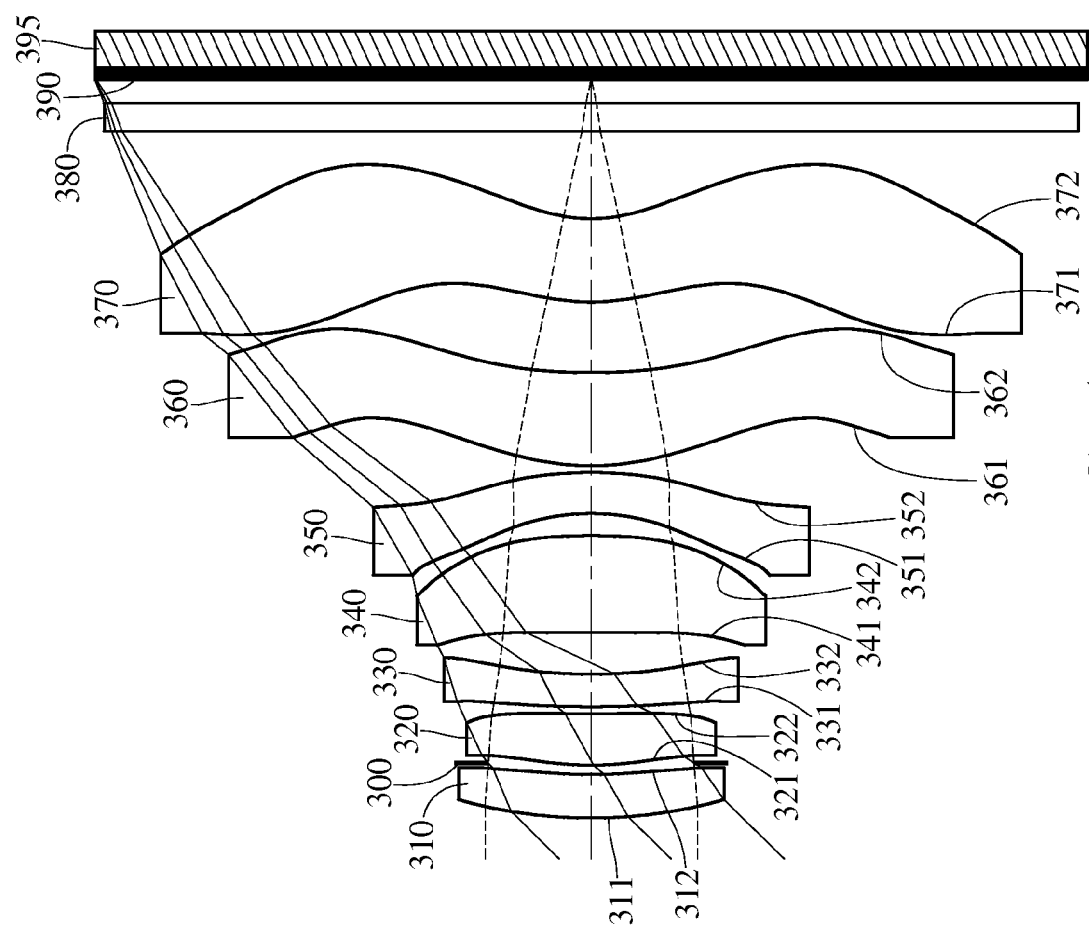
FIG. 5 is a schematic view of an image capturing unit according to the 3rd embodiment of the present disclosure.
Figure 6:
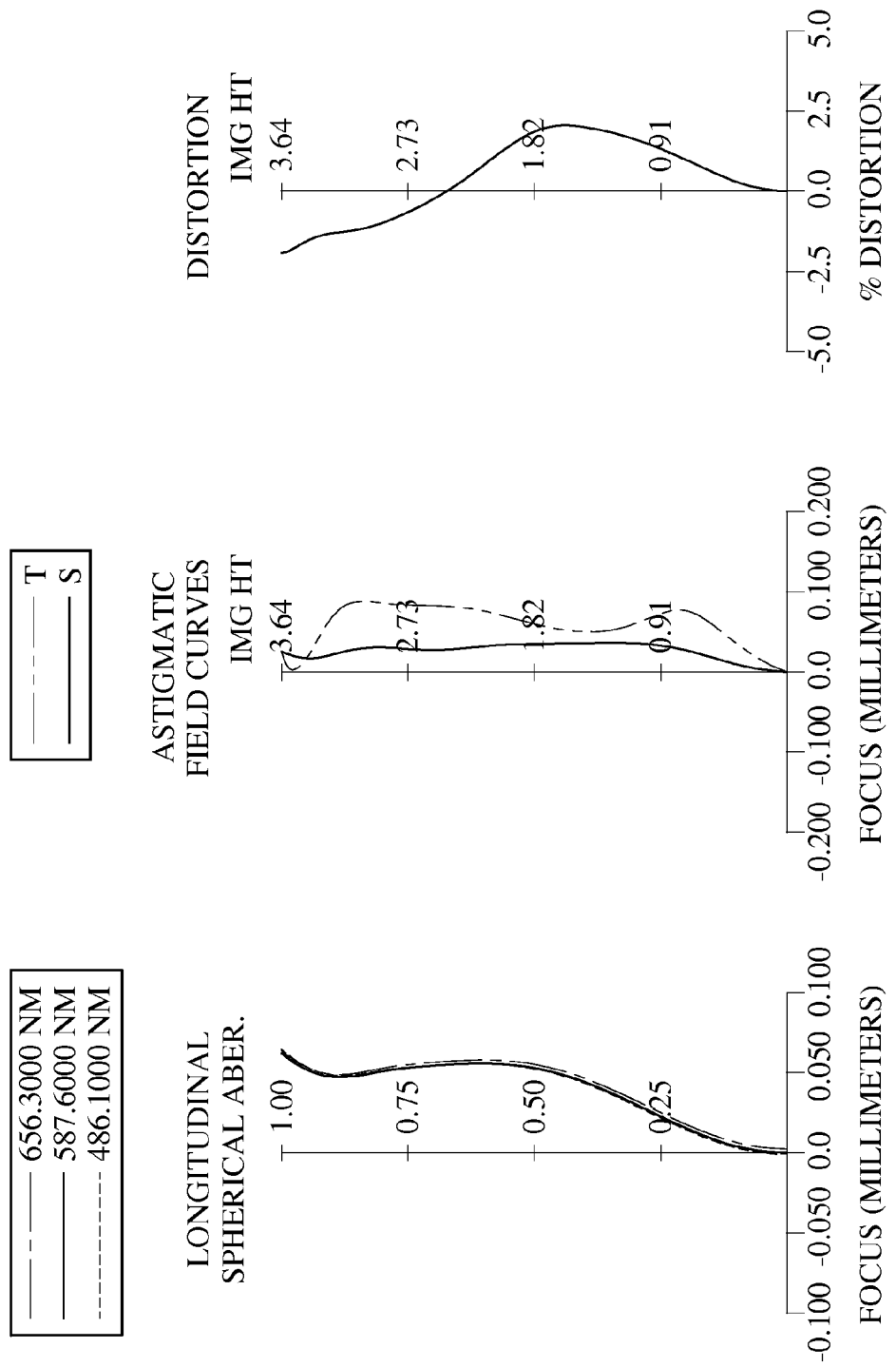
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 395. The photographing optical lens assembly includes, in order from an object side to an image side, a first lens element 310, an aperture stop 300, a second lens element 320, a third lens element 330, a fourth lens element 340, a fifth lens element 350, a sixth lens element 360, a seventh lens element 370, an IR-cut filter 380 and an image surface 390, wherein the photographing optical lens assembly has a total of seven single and non-cemented lens elements (310-370).

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. A center of the image-side surface 342 of the fourth lens element 340 is a point closest to the image surface 390 on the image-side surface 342.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with positive refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex shape in an off-axis region thereof.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The image-side surface 372 of the seventh lens element 370 has at least one convex shape in an off-axis region thereof.

The IR-cut filter 380 is made of glass and located between the seventh lens element 370 and the image surface 390, and will not affect the focal length of the photographing optical lens assembly. The image sensor 395 is disposed on or near the image surface 390 of the photographing optical lens assembly.

The detailed optical data of the 3rd embodiment are shown in Table 5 and the aspheric surface data are shown in Table 6 below.

TABLE 5

3rd Embodiment
f = 3.62 mm, Fno = 2.32, HFOV = 45.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.360 (ASP) | 0.320 | Plastic | 1.544 | 55.9 | 278.80 |
| 2 | | 3.321 (ASP) | 0.086 | | | | |
| 3 | Ape. Stop | Plano | −0.017 | | | | |
| 4 | Lens 2 | 2.154 (ASP) | 0.378 | Plastic | 1.544 | 55.9 | 4.48 |
| 5 | | 17.490 (ASP) | 0.050 | | | | |
| 6 | Lens 3 | 7.518 (ASP) | 0.240 | Plastic | 1.639 | 23.5 | −11.64 |
| 7 | | 3.692 (ASP) | 0.305 | | | | |
| 8 | Lens 4 | 27.833 (ASP) | 0.714 | Plastic | 1.544 | 55.9 | 7.55 |
| 9 | | −4.777 (ASP) | 0.162 | | | | |

TABLE 5-continued

3rd Embodiment
f = 3.62 mm, Fno = 2.32, HFOV = 45.5 deg.

| Surface # | | Curvature Radius | Thickness | Material | Index | Abbe # | Focal Length |
|---|---|---|---|---|---|---|---|
| 10 | Lens 5 | −1.754 (ASP) | 0.301 | Plastic | 1.639 | 23.5 | −5.83 |
| 11 | | −3.533 (ASP) | 0.051 | | | | |
| 12 | Lens 6 | 1.835 (ASP) | 0.686 | Plastic | 1.544 | 55.9 | 5.12 |
| 13 | | 4.666 (ASP) | 0.518 | | | | |
| 14 | Lens 7 | 1.579 (ASP) | 0.612 | Plastic | 1.535 | 55.7 | −11.38 |
| 15 | | 1.084 (ASP) | 0.640 | | | | |
| 16 | IR-cut filter | Plano | 0.210 | Glass | 1.517 | 64.2 | — |
| 17 | | Plano | 0.169 | | | | |
| 18 | Image | Plano | — | | | | |

Note:
Reference wavelength (d-line) is 587.6 nm.

TABLE 6

Aspheric Coefficients

| | Surface # | | | | |
|---|---|---|---|---|---|
| | 1 | 2 | 4 | 5 | 6 |
| k = | −4.0388E+00 | −4.0479E+01 | −1.2202E+01 | 3.9860E+01 | 4.1242E+01 |
| A4 = | −2.0345E−02 | −1.0622E−01 | −1.1226E−01 | −6.3895E−02 | −1.3085E−02 |
| A6 = | 4.3482E−02 | 1.1550E−01 | 8.0254E−02 | −1.0958E−01 | −1.2807E−02 |
| A8 = | −3.7139E−02 | 8.1632E−03 | −1.3731E−01 | 1.1170E−01 | 3.9027E−03 |
| A10 = | 2.1072E−02 | −1.6401E−01 | 1.9577E−02 | −8.7544E−02 | −3.9306E−02 |
| A12 = | 3.3979E−03 | 1.9207E−01 | 2.0689E−01 | 1.3522E−02 | 2.0635E−02 |
| A14 = | −5.8158E−03 | −8.4909E−02 | −2.4224E−01 | −2.0739E−02 | −1.1133E−02 |

| | Surface # | | | | |
|---|---|---|---|---|---|
| | 7 | 8 | 9 | 10 | 11 |
| k = | −1.9093E+00 | 2.8779E+01 | 1.1400E+01 | 6.4893E−01 | −1.1417E+00 |
| A4 = | 7.1973E−03 | −4.9661E−02 | −9.9347E−02 | −7.4258E−02 | −1.5214E−01 |
| A6 = | −2.4305E−03 | −1.1104E−02 | −2.3334E−01 | 6.6002E−02 | 1.8219E−01 |
| A8 = | −1.0553E−02 | −1.7323E−02 | 6.9474E−01 | 2.2187E−01 | −7.9956E−02 |
| A10 = | −8.9745E−03 | −5.5200E−03 | −9.0971E−01 | −2.4071E−01 | 2.2186E−02 |
| A12 = | 7.4779E−06 | 1.3020E−02 | 6.9902E−01 | 9.7043E−02 | −4.8422E−03 |
| A14 = | — | — | −3.0184E−01 | −1.4196E−02 | 5.6203E−04 |
| A16 = | — | — | 5.5578E−02 | — | — |

| | Surface # | | | |
|---|---|---|---|---|
| | 12 | 13 | 14 | 15 |
| k = | −8.3116E+00 | −1.8332E+00 | −2.6850E+00 | −2.3600E+00 |
| A4 = | 5.3473E−02 | 6.3765E−02 | −1.8475E−01 | −1.3477E−01 |
| A6 = | −4.8425E−02 | −4.2536E−02 | 5.0980E−02 | 5.6824E−02 |
| A8 = | 1.9203E−02 | 1.1102E−02 | −7.2147E−03 | −1.6122E−02 |
| A10 = | −5.8116E−03 | −1.7475E−03 | 6.7638E−04 | 2.6621E−03 |
| A12 = | 1.0084E−03 | 1.5769E−04 | −4.8856E−05 | −2.4417E−04 |
| A14 = | −6.7875E−05 | −6.0019E−06 | 2.5358E−06 | 1.1551E−05 |
| A16 = | — | — | −6.3555E−08 | −2.1972E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.62 | Dr1r6/CT4 | 1.48 |
| Fno | 2.32 | f2/|f1| | 0.02 |
| HFOV [deg.] | 45.5 | R12/f | 1.29 |
| V2/V3 | 2.38 | (|R13| + |R14|)/f | 0.74 |
| V3 + V5 | 47.0 | R14/f | 0.30 |
| CT2/CT1 | 1.18 | TL/ImgH | 1.49 |
| CT4/CT5 | 2.37 | |f/f1| + |f/f2| | 0.82 |
| ΣCT/Td | 0.74 | |Powmax| | 0.81 |

4th Embodiment

Figure 7:
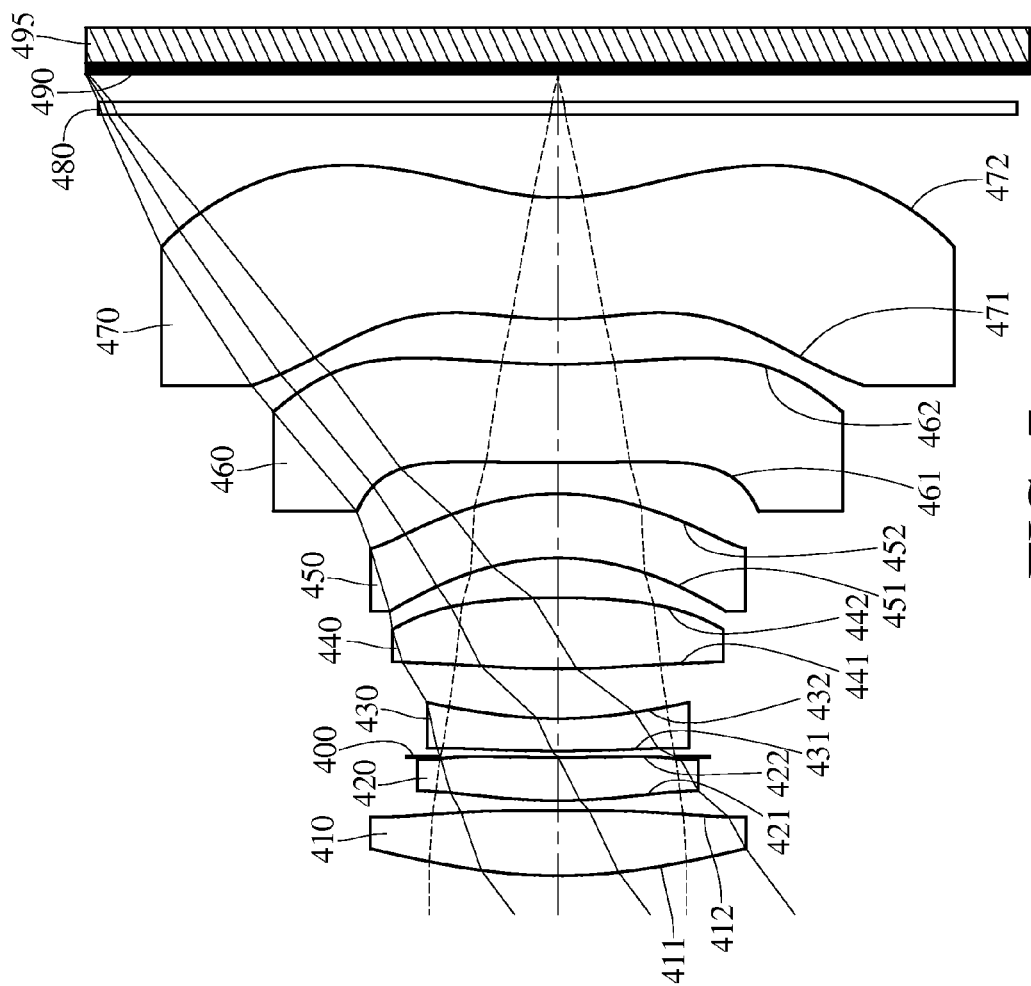
FIG. 7 is a schematic view of an image capturing unit according to the 4th embodiment of the present disclosure.
Figure 8:
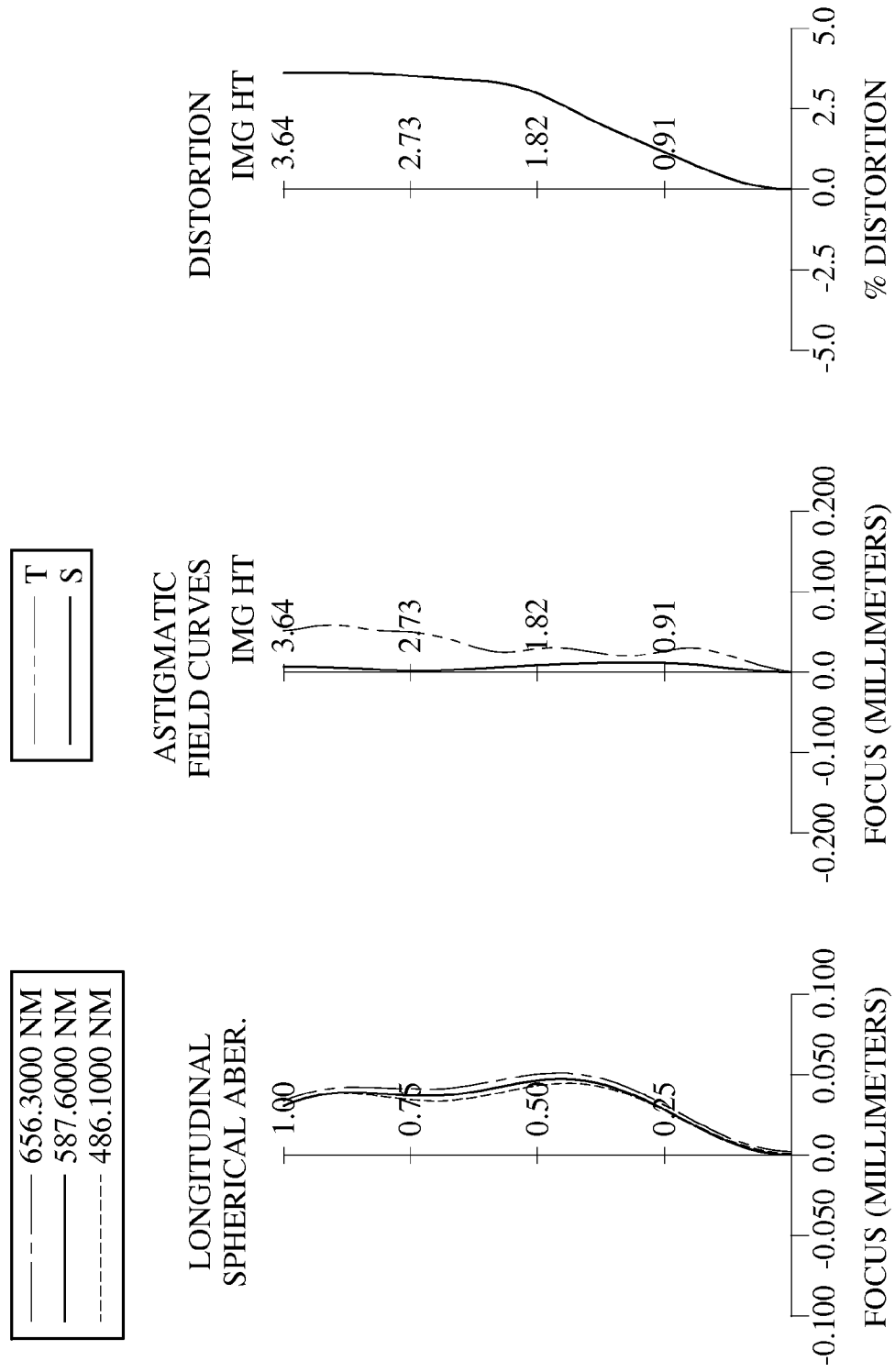
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 495. The photographing optical lens assembly includes, in order from an object side to an image side, a first lens element 410, a second lens element 420, an aperture stop 400, a third lens element 430, a fourth lens element 440, a fifth lens element 450, a sixth lens element 460, a seventh lens element 470, an IR-cut filter 480 and an image surface 490, wherein the photographing optical lens assembly has a total of seven single and non-cemented lens elements (410-470).

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. A center of the image-side surface 442 of the fourth lens element 440 is a point closest to the image surface 490 on the image-side surface 442.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex shape in an off-axis region thereof.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The image-side surface 472 of the seventh lens element 470 has at least one convex shape in an off-axis region thereof.

The IR-cut filter 480 is made of glass and located between the seventh lens element 470 and the image surface 490, and will not affect the focal length of the photographing optical lens assembly. The image sensor 495 is disposed on or near the image surface 490 of the photographing optical lens assembly.

The detailed optical data of the 4th embodiment are shown in Table 7 and the aspheric surface data are shown in Table 8 below.

TABLE 7

4th Embodiment
f = 4.67 mm, Fno = 2.35, HFOV = 36.8 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Lens 1 | 4.004 (ASP) | 0.505 | Plastic | 1.544 | 55.9 | 6.98 |
| 2 |  | −71.361 (ASP) | 0.076 |  |  |  |  |
| 3 | Lens 2 | 4.039 (ASP) | 0.333 | Plastic | 1.544 | 55.9 | 9.40 |
| 4 |  | 18.668 (ASP) | 0.005 |  |  |  |  |
| 5 | Ape. Stop | Plano | 0.045 |  |  |  |  |
| 6 | Lens 3 | 10.076 (ASP) | 0.252 | Plastic | 1.639 | 23.5 | −7.43 |
| 7 |  | 3.197 (ASP) | 0.385 |  |  |  |  |
| 8 | Lens 4 | 6.861 (ASP) | 0.550 | Plastic | 1.544 | 55.9 | 6.50 |
| 9 |  | −7.101 (ASP) | 0.307 |  |  |  |  |
| 10 | Lens 5 | −1.984 (ASP) | 0.498 | Plastic | 1.544 | 55.9 | 20.32 |
| 11 |  | −1.831 (ASP) | 0.243 |  |  |  |  |
| 12 | Lens 6 | −116.018 (ASP) | 0.758 | Plastic | 1.639 | 23.5 | −7.90 |
| 13 |  | 5.292 (ASP) | 0.350 |  |  |  |  |
| 14 | Lens 7 | 2.834 (ASP) | 0.939 | Plastic | 1.544 | 55.9 | −13.52 |
| 15 |  | 1.807 (ASP) | 0.640 |  |  |  |  |
| 16 | IR-cut filter | Plano | 0.100 | Glass | 1.517 | 64.2 | — |
| 17 |  | Plano | 0.214 |  |  |  |  |
| 18 | Image | Plano | — |  |  |  |  |

Note:
Reference wavelength (d-line) is 587.6 nm.

TABLE 8

Aspheric Coefficients

| Surface # | | | | |
|---|---|---|---|---|
| 1 | 2 | 3 | 4 | 6 |
| k = −3.6565E+00 | 9.0000E+01 | −7.6309E+00 | −1.0000E+00 | −7.4925E+01 |
| A4 = −8.6100E−03 | −7.2708E−02 | −7.2703E−02 | 1.3070E−01 | 1.3758E−03 |
| A6 = −3.8418E−03 | 1.0026E−01 | 1.0658E−01 | −1.0564E−01 | −3.6431E−02 |
| A8 = 8.0492E−03 | −8.5540E−02 | −1.1657E−01 | 5.5535E−02 | −2.3320E−02 |
| A10 = −7.1515E−03 | 4.4242E−02 | 4.6288E−02 | −7.2527E−02 | 1.6665E−02 |
| A12 = 3.0658E−03 | −1.1987E−02 | 2.3859E−03 | 1.0726E−01 | 5.9465E−02 |
| A14 = −4.7692E−04 | 1.3608E−03 | −4.5682E−03 | −4.7626E−02 | −4.0104E−02 |

| Surface # | | | | |
|---|---|---|---|---|
| 7 | 8 | 9 | 10 | 11 |
| k = −1.2814E+01 | −9.0000E+01 | 1.4197E+01 | 8.3719E−01 | −1.1348E+01 |
| A4 = −9.3402E−03 | −5.7363E−03 | −5.0454E−02 | 2.1556E−02 | −9.1469E−02 |
| A6 = −2.3807E−03 | −7.3057E−03 | 2.7742E−02 | 2.4165E−02 | 7.5936E−02 |
| A8 = 6.2161E−03 | −2.4487E−03 | −1.7272E−02 | 4.7832E−03 | −5.3862E−02 |
| A10 = 1.4036E−03 | 2.2376E−03 | −1.3138E−02 | −2.6945E−02 | 2.3442E−02 |
| A12 = −4.1680E−06 | 1.2003E−03 | 1.9781E−02 | 2.2513E−02 | −5.2889E−03 |
| A14 = — | — | −8.2637E−03 | −5.0563E−03 | 7.0466E−04 |
| A16 = — | — | 1.1134E−03 | — | — |

| Surface # | | | |
|---|---|---|---|
| 12 | 13 | 14 | 15 |
| k = 9.0000E+01 | −9.0000E+01 | −2.1324E+00 | −2.8934E+00 |
| A4 = 6.2764E−02 | −1.6772E−02 | −1.9344E−01 | −9.9396E−02 |
| A6 = −1.2331E−01 | 4.7185E−03 | 8.4367E−02 | 4.0125E−02 |
| A8 = 1.0025E−01 | −4.8129E−03 | −3.0448E−02 | −1.1453E−02 |
| A10 = −5.9173E−02 | 1.2078E−03 | 7.9586E−03 | 2.0242E−03 |
| A12 = 1.8921E−02 | −1.1401E−04 | −1.2523E−03 | −2.1108E−04 |
| A14 = −2.7217E−03 | 3.3298E−06 | 1.0511E−04 | 1.1914E−05 |
| A16 = — | — | −3.6505E−06 | −2.8170E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 4.67 | Dr1r6/CT4 | 2.21 |
| Fno | 2.35 | f2/|f1| | 1.35 |
| HFOV [deg.] | 36.8 | R12/f | 1.13 |
| V2/V3 | 2.38 | (|R13| + |R14|)/f | 0.99 |
| V3 + V5 | 79.4 | R14/f | 0.39 |
| CT2/CT1 | 0.66 | TL/ImgH | 1.70 |
| CT4/CT5 | 1.10 | |f/f1| + |f/f2| | 1.17 |
| ΣCT/Td | 0.73 | |Powmax| | 0.72 |

5th Embodiment

Figure 9:
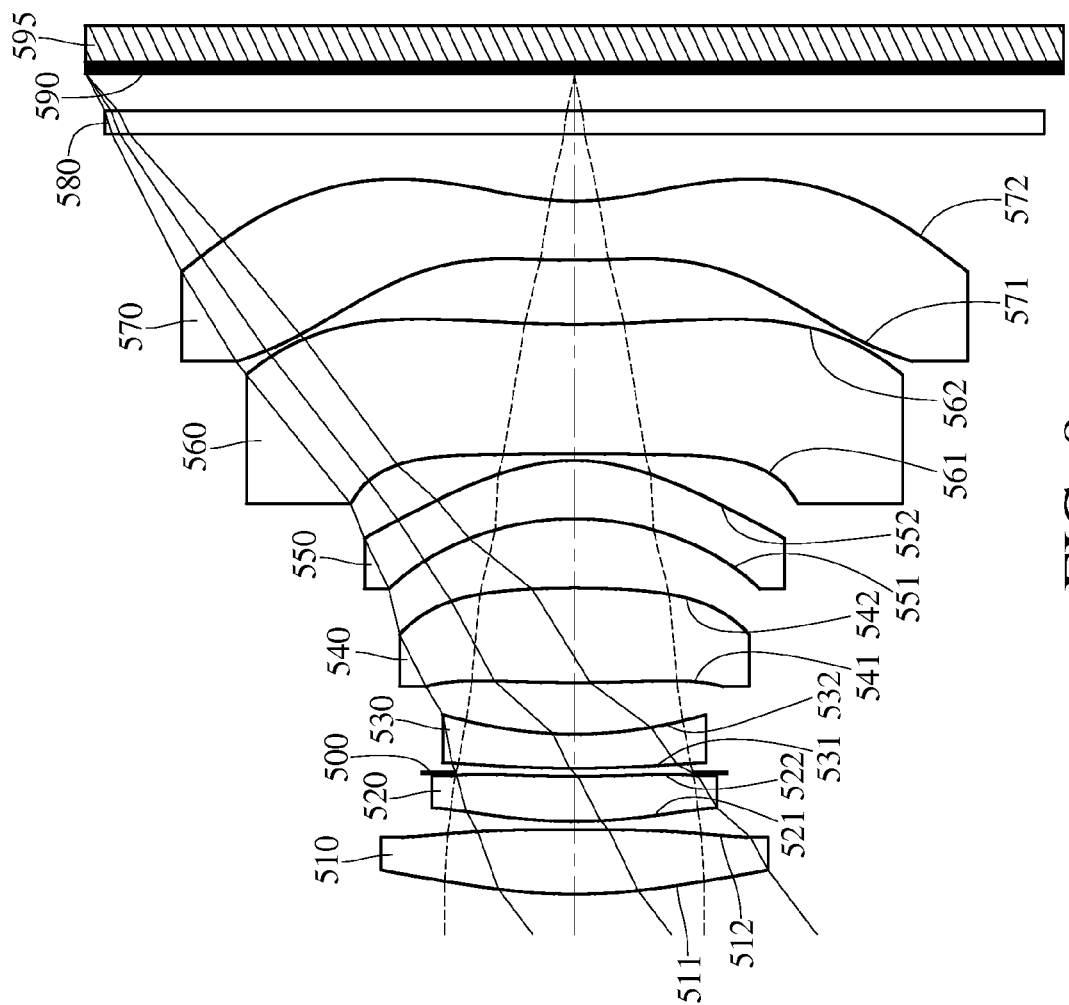
FIG. 9 is a schematic view of an image capturing unit according to the 5th embodiment of the present disclosure.
Figure 10:
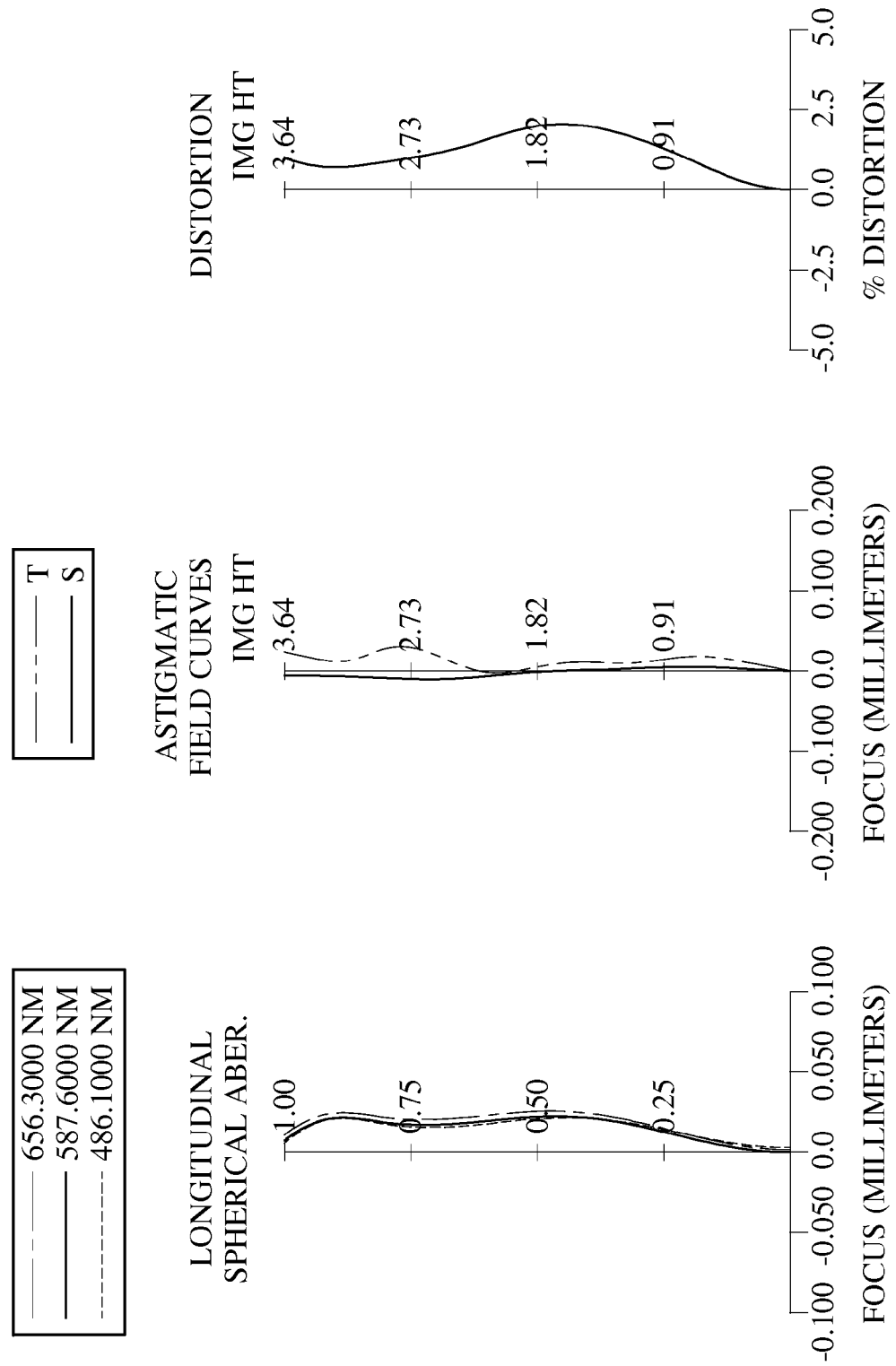
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 595. The photographing optical lens assembly includes, in order from an object side to an image side, a first lens element 510, a second lens element 520, an aperture stop 500, a third lens element 530, a fourth lens element 540, a fifth lens element 550, a sixth lens element 560, a seventh lens element 570, an IR-cut filter 580 and an image surface 590, wherein the photographing optical lens assembly has a total of seven single and non-cemented lens elements (510-570).

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. A center of the image-side surface 542 of the fourth lens element 540 is a point closest to the image surface 590 on the image-side surface 542.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex shape in an off-axis region thereof.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The image-side surface 572 of the seventh lens element 570 has at least one convex shape in an off-axis region thereof.

The IR-cut filter 580 is made of glass and located between the seventh lens element 570 and the image surface 590, and will not affect the focal length of the photographing optical lens assembly. The image sensor 595 is disposed on or near the image surface 590 of the photographing optical lens assembly.

The detailed optical data of the 5th embodiment are shown in Table 9 and the aspheric surface data are shown in Table 10 below.

TABLE 9

5th Embodiment
f = 4.74 mm, Fno = 2.45, HFOV = 37.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 4.000 (ASP) | 0.482 | Plastic | 1.544 | 55.9 | 7.02 |
| 2 | | −82.116 (ASP) | 0.061 | | | | |
| 3 | Lens 2 | 3.560 (ASP) | 0.338 | Plastic | 1.544 | 55.9 | 9.45 |
| 4 | | 11.183 (ASP) | 0.024 | | | | |
| 5 | Ape. Stop | Plano | 0.035 | | | | |
| 6 | Lens 3 | 9.076 (ASP) | 0.255 | Plastic | 1.633 | 23.4 | −7.47 |
| 7 | | 3.074 (ASP) | 0.384 | | | | |
| 8 | Lens 4 | 10.131 (ASP) | 0.707 | Plastic | 1.544 | 55.9 | 8.12 |
| 9 | | −7.643 (ASP) | 0.517 | | | | |
| 10 | Lens 5 | −2.217 (ASP) | 0.435 | Plastic | 1.544 | 55.9 | 6.27 |
| 11 | | −1.437 (ASP) | 0.050 | | | | |
| 12 | Lens 6 | −15.244 (ASP) | 0.967 | Plastic | 1.633 | 23.4 | −7.72 |
| 13 | | 7.359 (ASP) | 0.478 | | | | |
| 14 | Lens 7 | 6.109 (ASP) | 0.442 | Plastic | 1.514 | 56.8 | −5.57 |
| 15 | | 1.900 (ASP) | 0.500 | | | | |
| 16 | IR-cut filter | Plano | 0.175 | Glass | 1.517 | 64.2 | — |
| 17 | | Plano | 0.276 | | | | |
| 18 | Image | Plano | — | — | | | |

Note:
Reference wavelength (d-line) is 587.6 nm.

TABLE 10

Aspheric Coefficients

| Surface # | | | | |
|---|---|---|---|---|
| 1 | 2 | 3 | 4 | 6 |

| | 1 | 2 | 3 | 4 | 6 |
|---|---|---|---|---|---|
| k = | −6.5077E+00 | −1.0000E+00 | −3.4665E+00 | −2.3034E+01 | 2.1153E+01 |
| A4 = | −1.1247E−02 | −7.7199E−02 | −5.7049E−02 | 2.1782E−02 | 6.2080E−03 |
| A6 = | −5.5906E−03 | 9.9825E−02 | 6.9638E−02 | −1.3086E−01 | −3.5537E−02 |
| A8 = | 8.3649E−03 | −8.5199E−02 | −5.3569E−02 | 9.7419E−02 | −1.1061E−02 |
| A10 = | −7.0208E−03 | 4.4503E−02 | −2.6021E−02 | −1.2158E−01 | 1.7559E−02 |
| A12 = | 3.0683E−03 | −1.2041E−02 | 4.4256E−02 | 1.4397E−01 | 3.8599E−02 |
| A14 = | −4.5265E−04 | 1.3898E−03 | −1.4176E−02 | −6.0780E−02 | −2.7582E−02 |

| Surface # | | | | |
|---|---|---|---|---|
| 7 | 8 | 9 | 10 | 11 |

| | 7 | 8 | 9 | 10 | 11 |
|---|---|---|---|---|---|
| k = | −9.3365E+00 | −9.0000E+01 | 2.2354E+01 | 1.1590E+00 | −5.6217E+00 |
| A4 = | 9.0308E−03 | −2.8978E−02 | −4.7325E−02 | −3.4279E−02 | −7.6069E−02 |

TABLE 10-continued

| Aspheric Coefficients | | | | |
|---|---|---|---|---|
| A6 = | 8.1557E−03 | −1.0549E−02 | 7.7165E−03 | 1.0867E−01 | 7.3412E−02 |
| A8 = | −5.6574E−04 | −5.4052E−03 | −1.5716E−02 | −9.5569E−02 | −5.1598E−02 |
| A10 = | −2.0858E−03 | 3.6967E−03 | −1.2275E−02 | 3.5766E−02 | 2.3723E−02 |
| A12 = | 3.4249E−07 | −4.1886E−03 | 1.9078E−02 | −2.5488E−03 | −5.4961E−03 |
| A14 = | — | — | −8.3590E−03 | −5.8676E−04 | 4.3247E−04 |
| A16 = | — | — | 1.1506E−03 | — | — |

| | Surface # | | | |
|---|---|---|---|---|
| | 12 | 13 | 14 | 15 |
| k = | 8.2775E+00 | −6.9068E+01 | −2.7973E+00 | −5.8349E+00 |
| A4 = | 7.7159E−02 | −2.3245E−02 | −1.8052E−01 | −9.4898E−02 |
| A6 = | −1.1982E−01 | 9.9937E−03 | 7.2566E−02 | 4.0280E−02 |
| A8 = | 8.7260E−02 | −5.2950E−03 | −1.9795E−02 | −1.3210E−02 |
| A10 = | −4.3408E−02 | 1.3288E−03 | 3.9063E−03 | 2.7977E−03 |
| A12 = | 1.2196E−02 | −1.5993E−04 | −5.0398E−04 | −3.5299E−04 |
| A14 = | −1.5072E−03 | 7.4386E−06 | 3.7380E−05 | 2.4000E−05 |
| A16 = | — | — | −1.2134E−06 | −6.7423E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.74 | Dr1r6/CT4 | 1.69 |
| Fno | 2.45 | f2/|f1| | 1.35 |
| HFOV [deg.] | 37.2 | R12/f | 1.55 |
| V2/V3 | 2.39 | (|R13| + |R14|)/f | 1.69 |
| V3 + V5 | 79.3 | R14/f | 0.40 |
| CT2/CT1 | 0.70 | TL/ImgH | 1.68 |
| CT4/CT5 | 1.63 | |f/f1| + |f/f2| | 1.18 |
| ΣCT/Td | 0.70 | |Powmax| | 0.85 |

6th Embodiment

Figure 11:
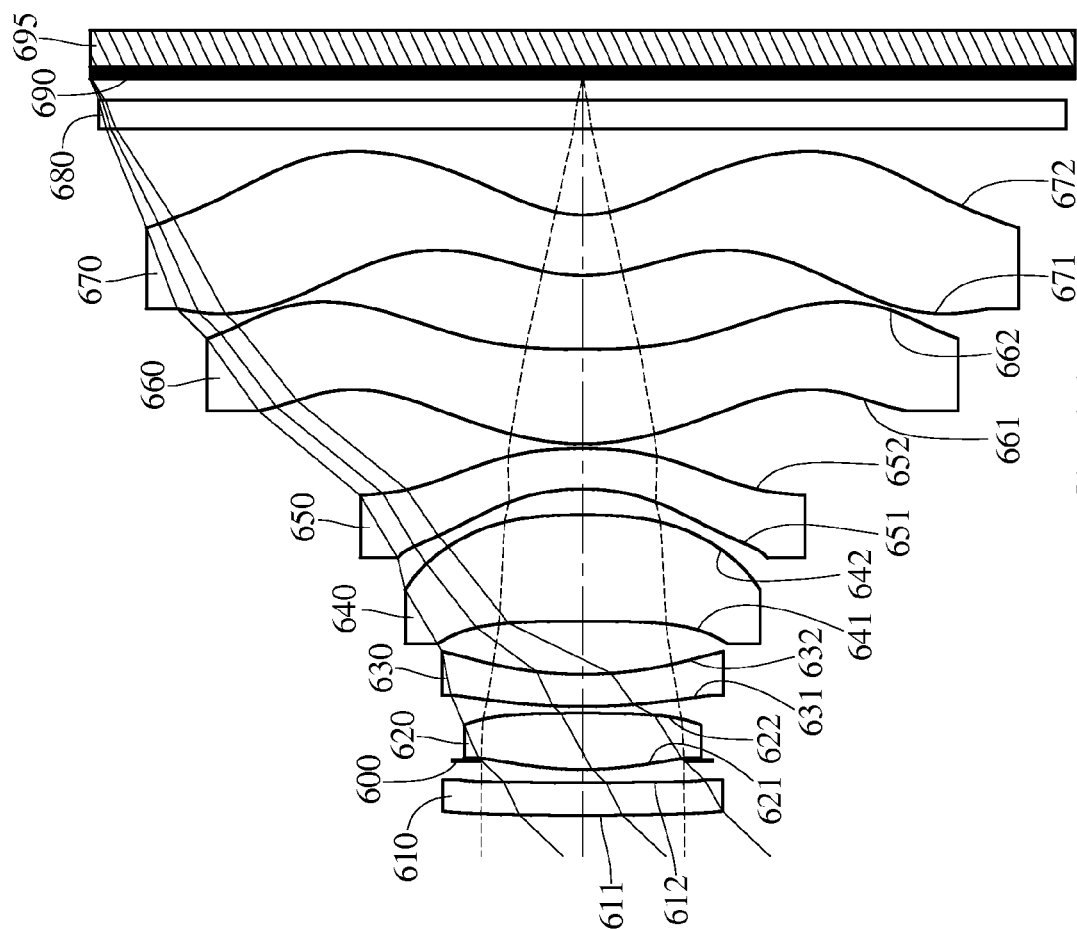
FIG. 11 is a schematic view of an image capturing unit according to the 6th embodiment of the present disclosure.
Figure 12:
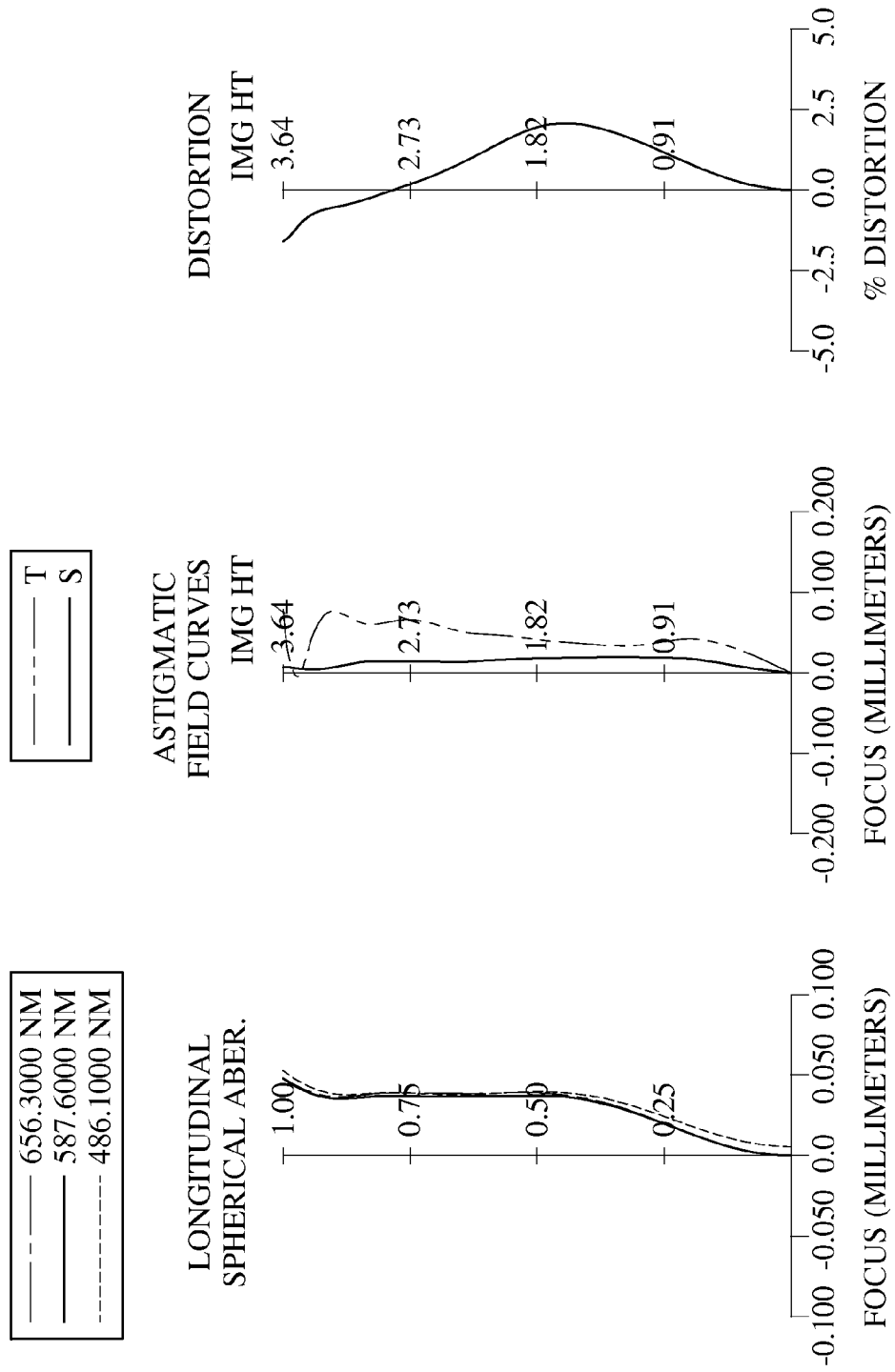
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 695. The photographing optical lens assembly includes, in order from an object side to an image side, a first lens element 610, an aperture stop 600, a second lens element 620, a third lens element 630, a fourth lens element 640, a fifth lens element 650, a sixth lens element 660, a seventh lens element 670, an IR-cut filter 680 and an image surface 690, wherein the photographing optical lens assembly has a total of seven single and non-cemented lens elements (610-670).

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. A center of the image-side surface 642 of the fourth lens element 640 is a point closest to the image surface 690 on the image-side surface 642.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with positive refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex shape in an off-axis region thereof.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The image-side surface 672 of the seventh lens element 670 has at least one convex shape in an off-axis region thereof.

The IR-cut filter 680 is made of glass and located between the seventh lens element 670 and the image surface 690, and will not affect the focal length of the photographing optical lens assembly. The image sensor 695 is disposed on or near the image surface 690 of the photographing optical lens assembly.

The detailed optical data of the 6th embodiment are shown in Table 11 and the aspheric surface data are shown in Table 12 below.

TABLE 11

6th Embodiment
f = 3.49 mm, Fno = 2.32, HFOV = 46.5 deg.

| Surface # |           | Curvature Radius | Thickness | Material | Index | Abbe # | Focal Length |
|-----------|-----------|------------------|-----------|----------|-------|--------|--------------|
| 0         | Object    | Plano            | Infinity  |          |       |        |              |
| 1         | Lens 1    | 16.525 (ASP)     | 0.241     | Plastic  | 1.661 | 20.4   | −116.48      |
| 2         |           | 13.525 (ASP)     | 0.167     |          |       |        |              |
| 3         | Ape. Stop | Plano            | −0.067    |          |       |        |              |
| 4         | Lens 2    | 2.463 (ASP)      | 0.417     | Plastic  | 1.544 | 55.9   | 4.11         |
| 5         |           | −22.649 (ASP)    | 0.050     |          |       |        |              |
| 6         | Lens 3    | 4.682 (ASP)      | 0.240     | Plastic  | 1.661 | 20.4   | −13.50       |
| 7         |           | 3.008 (ASP)      | 0.393     |          |       |        |              |
| 8         | Lens 4    | −22.037 (ASP)    | 0.789     | Plastic  | 1.544 | 55.9   | 11.46        |
| 9         |           | −4.923 (ASP)     | 0.192     |          |       |        |              |
| 10        | Lens 5    | −1.755 (ASP)     | 0.300     | Plastic  | 1.661 | 20.4   | −5.78        |
| 11        |           | −3.469 (ASP)     | 0.035     |          |       |        |              |
| 12        | Lens 6    | 1.780 (ASP)      | 0.701     | Plastic  | 1.544 | 55.9   | 4.15         |
| 13        |           | 7.242 (ASP)      | 0.547     |          |       |        |              |
| 14        | Lens 7    | 1.200 (ASP)      | 0.450     | Plastic  | 1.544 | 55.9   | −9.56        |
| 15        |           | 0.846 (ASP)      | 0.640     |          |       |        |              |
| 16        | IR-cut filter | Plano        | 0.210     | Glass    | 1.517 | 64.2   | —            |
| 17        |           | Plano            | 0.159     |          |       |        |              |
| 18        | Image     | Plano            | —         |          |       |        |              |

Note:
Reference wavelength (d-line) is 587.6 nm.

TABLE 12

Aspheric Coefficients

| Surface # | 1 | 2 | 4 | 5 | 6 |
|---|---|---|---|---|---|
| k = | −4.2880E+01 | −9.0000E+01 | −7.7548E+00 | 9.0000E+01 | 1.6158E+01 |
| A4 = | −3.1445E−02 | −9.1230E−02 | −7.8298E−02 | −8.0734E−02 | −3.0360E−02 |
| A6 = | 3.9708E−02 | 1.3834E−01 | 1.3560E−01 | −6.3416E−02 | −1.3646E−02 |
| A8 = | −1.7702E−02 | −1.1591E−02 | −1.7813E−01 | 9.5772E−02 | 9.9323E−03 |
| A10 = | 4.4459E−03 | −1.7441E−01 | −1.6113E−01 | −1.5921E−01 | −3.3447E−02 |
| A12 = | 8.4300E−03 | 2.4007E−01 | 6.2641E−01 | 1.4276E−01 | 2.4604E−02 |
| A14 = | −4.2081E−03 | −9.3551E−02 | −4.8852E−01 | −8.6828E−02 | −1.6363E−02 |

| Surface # | 7 | 8 | 9 | 10 | 11 |
|---|---|---|---|---|---|
| k = | −1.1018E+00 | −5.8961E+01 | 9.1812E+00 | 5.3747E−01 | 5.0154E−01 |
| A4 = | 9.8558E−03 | −7.2382E−02 | −1.9008E−01 | −1.9274E−01 | −2.3342E−01 |
| A6 = | −9.2021E−03 | −7.7064E−03 | 7.0863E−02 | 3.3690E−01 | 3.0010E−01 |
| A8 = | 1.7490E−03 | −2.2342E−02 | 1.5924E−02 | −1.7979E−01 | −1.8878E−01 |
| A10 = | −8.8900E−03 | −1.5190E−02 | −3.4754E−02 | 7.7186E−02 | 7.7136E−02 |
| A12 = | 7.4777E−06 | 1.5444E−02 | 2.5296E−02 | −2.8147E−02 | −1.8016E−02 |
| A14 = | — | — | −1.3518E−02 | 5.5859E−03 | 1.7410E−03 |
| A16 = | — | — | 2.7418E−03 | — | — |

| Surface # | 12 | 13 | 14 | 15 |
|---|---|---|---|---|
| k = | −8.3116E+00 | 2.0977E+00 | −2.9270E+00 | −2.5786E+00 |
| A4 = | 5.8493E−02 | 1.1209E−01 | −1.9398E−01 | −1.2869E−01 |
| A6 = | −3.7783E−02 | −6.6964E−02 | 6.1841E−02 | 5.2819E−02 |
| A8 = | 8.3286E−03 | 1.7636E−02 | −1.2238E−02 | −1.4481E−02 |
| A10 = | −1.3206E−03 | −2.6860E−03 | 1.6929E−03 | 2.3219E−03 |
| A12 = | 1.6647E−04 | 2.2066E−04 | −1.5030E−04 | −2.0874E−04 |

TABLE 12-continued

| Aspheric Coefficients | | | | |
|---|---|---|---|---|
| A14 = | −9.6327E−06 | −7.4066E−06 | 7.4534E−06 | 9.8173E−06 |
| A16 = | — | — | −1.5528E−07 | −1.8870E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.49 | Dr1r6/CT4 | 1.33 |
| Fno | 2.32 | f2/\|f1\| | 0.04 |
| HFOV [deg.] | 46.5 | R12/f | 2.08 |
| V2/V3 | 2.75 | (\|R13\| + \|R14\|)/f | 0.59 |
| V3 + V5 | 40.8 | R14/f | 0.24 |
| CT2/CT1 | 1.73 | TL/ImgH | 1.50 |
| CT4/CT5 | 2.63 | \|f/f1\| + \|f/f2\| | 0.88 |
| ΣCT/Td | 0.70 | \|Powmax\| | 0.85 |

7th Embodiment

Figure 13:
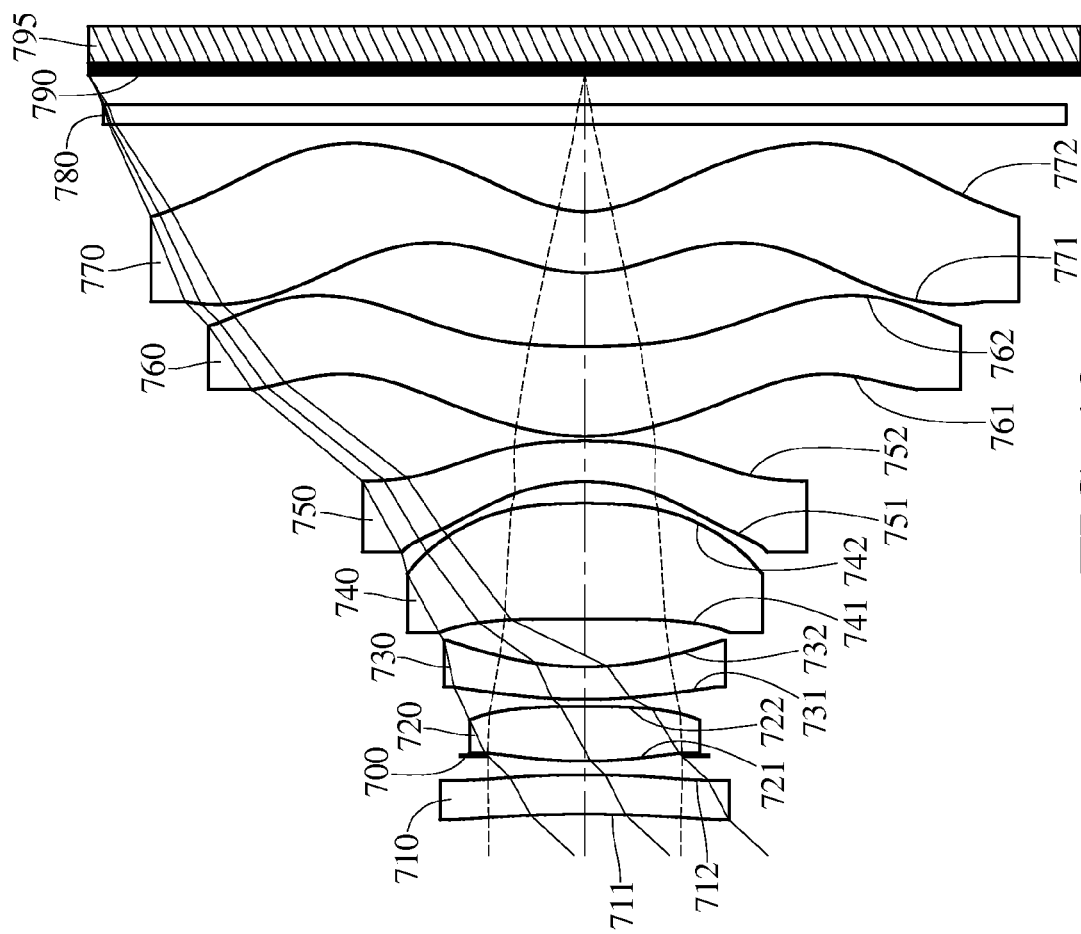
FIG. 13 is a schematic view of an image capturing unit according to the 7th embodiment of the present disclosure.
Figure 14:
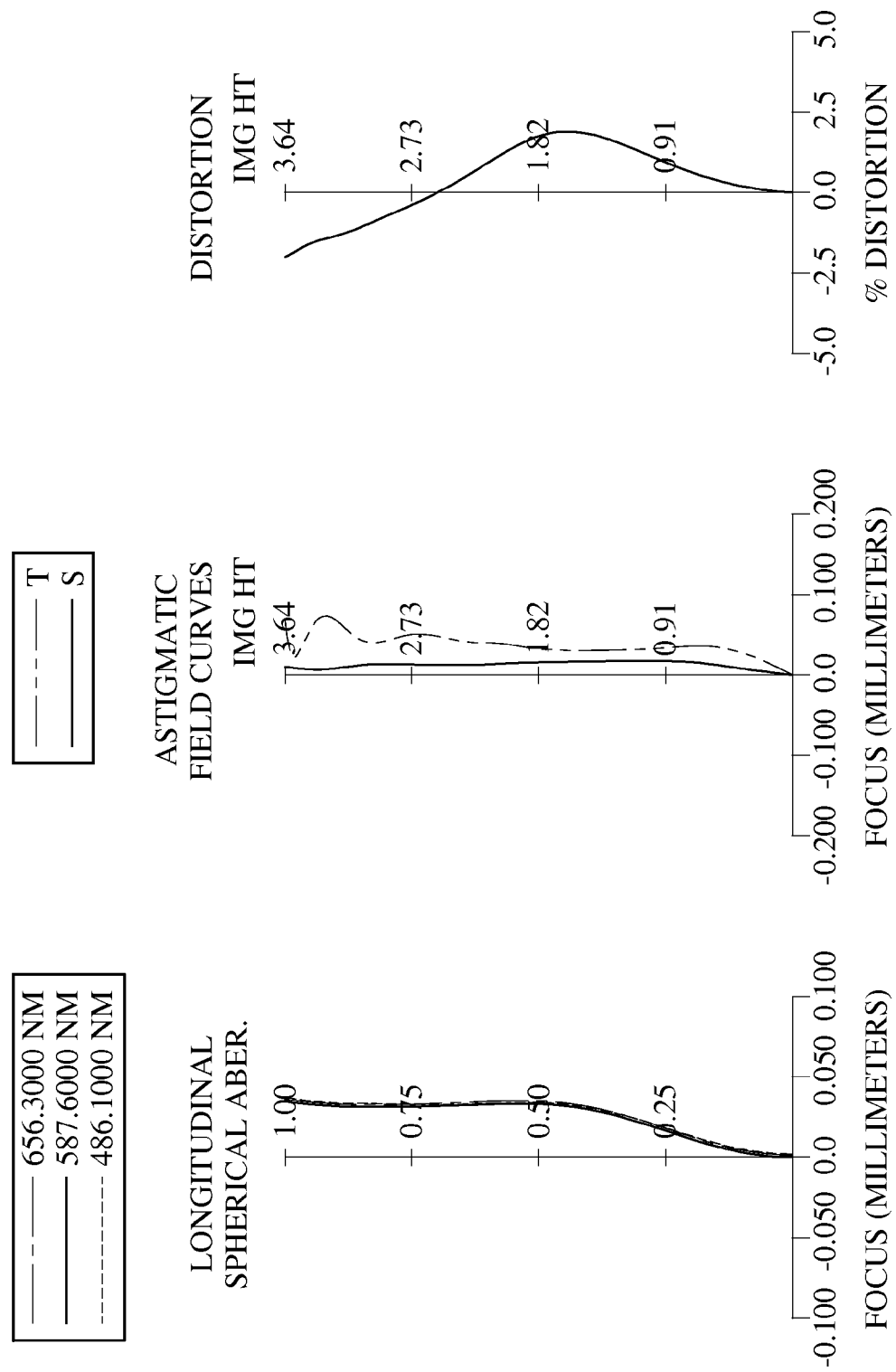
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 795. The photographing optical lens assembly includes, in order from an object side to an image side, a first lens element 710, an aperture stop 700, a second lens element 720, a third lens element 730, a fourth lens element 740, a fifth lens element 750, a sixth lens element 760, a seventh lens element 770, an IR-cut filter 780 and an image surface 790, wherein the photographing optical lens assembly has a total of seven single and non-cemented lens elements (710-770).

The first lens element 710 with positive refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. A center of the image-side surface 742 of the fourth lens element 740 is a point closest to the image surface 790 on the image-side surface 742.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex shape in an off-axis region thereof.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The image-side surface 772 of the seventh lens element 770 has at least one convex shape in an off-axis region thereof.

The IR-cut filter 780 is made of glass and located between the seventh lens element 770 and the image surface 790, and will not affect the focal length of the photographing optical lens assembly. The image sensor 795 is disposed on or near the image surface 790 of the photographing optical lens assembly.

The detailed optical data of the 7th embodiment are shown in Table 13 and the aspheric surface data are shown in Table 14 below.

TABLE 13

7th Embodiment
f = 3.39 mm, Fno = 2.40, HFOV = 47.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −12.442 (ASP) | 0.291 | Plastic | 1.583 | 30.2 | 47.57 |
| 2 | | −8.665 (ASP) | 0.141 | | | | |
| 3 | Ape. Stop | Plano | −0.042 | | | | |
| 4 | Lens 2 | 3.046 (ASP) | 0.404 | Plastic | 1.544 | 55.9 | 4.27 |
| 5 | | −9.327 (ASP) | 0.050 | | | | |
| 6 | Lens 3 | 4.030 (ASP) | 0.240 | Plastic | 1.639 | 23.5 | −9.58 |
| 7 | | 2.374 (ASP) | 0.352 | | | | |
| 8 | Lens 4 | −118.122 (ASP) | 0.850 | Plastic | 1.544 | 55.9 | 9.72 |
| 9 | | −5.076 (ASP) | 0.158 | | | | |
| 10 | Lens 5 | −1.729 (ASP) | 0.300 | Plastic | 1.639 | 23.5 | −4.36 |
| 11 | | −4.862 (ASP) | 0.035 | | | | |
| 12 | Lens 6 | 1.604 (ASP) | 0.660 | Plastic | 1.544 | 55.9 | 3.59 |
| 13 | | 7.710 (ASP) | 0.541 | | | | |
| 14 | Lens 7 | 1.088 (ASP) | 0.450 | Plastic | 1.544 | 55.9 | −12.45 |
| 15 | | 0.801 (ASP) | 0.640 | | | | |
| 16 | IR-cut filter | Plano | 0.145 | Glass | 1.517 | 64.2 | — |
| 17 | | Plano | 0.217 | | | | |
| 18 | Image | Plano | — | — | | | |

Note:
Reference wavelength (d-line) is 587.6 nm.

TABLE 14

Aspheric Coefficients

| | | Surface # | | |
|---|---|---|---|---|
| 1 | 2 | 4 | 5 | 6 |
| k = −1.0000E+00 | −1.0000E+00 | −1.0051E+01 | 1.0067E+01 | 1.1608E+01 |
| A4 = −2.7918E−02 | −6.4970E−02 | −7.9559E−02 | −9.3079E−02 | −4.5725E−02 |
| A6 = 3.5639E−02 | 1.3373E−01 | 1.3723E−01 | −5.0292E−02 | −1.8694E−02 |
| A8 = −1.3340E−02 | −2.4548E−02 | −2.0515E−01 | 9.5414E−02 | 1.0812E−02 |
| A10 = 3.6662E−03 | −1.6794E−01 | −1.1714E−01 | −1.7371E−01 | −2.9936E−02 |
| A12 = 4.8552E−03 | 2.4483E−01 | 5.5936E−01 | 1.3757E−01 | 2.5259E−02 |
| A14 = −2.5441E−03 | −9.8809E−02 | −4.6191E−01 | −7.2913E−02 | −1.6131E−02 |

| | | Surface # | | |
|---|---|---|---|---|
| 7 | 8 | 9 | 10 | 11 |
| k = −2.1631E+00 | −8.4362E+01 | 7.9917E+00 | 5.2421E−01 | 2.4030E+00 |
| A4 = 4.0571E−03 | −5.8316E−02 | −1.8474E−01 | −1.6626E−01 | −2.8297E−01 |
| A6 = −1.2431E−02 | 7.3058E−04 | −2.3601E−02 | 1.7091E−01 | 3.4813E−01 |
| A8 = 3.9891E−03 | −1.6299E−02 | 1.8042E−01 | 1.1548E−01 | −2.1352E−01 |
| A10 = −6.7254E−03 | −1.7222E−02 | −1.5354E−01 | −1.5575E−01 | 8.3897E−02 |
| A12 = 7.4773E−06 | 1.9047E−02 | 7.5191E−02 | 5.8096E−02 | −1.8979E−02 |
| A14 = — | — | −3.1678E−02 | −6.6933E−03 | 1.8046E−03 |
| A16 = — | — | 7.0572E−03 | — | — |

| | Surface # | | |
|---|---|---|---|
| 12 | 13 | 14 | 15 |
| k = −8.3116E+00 | 3.5518E+00 | −2.7014E+00 | −2.4907E+00 |
| A4 = 6.2273E−02 | 1.2043E−01 | −1.9075E−01 | −1.2897E−01 |
| A6 = −3.6519E−02 | −6.9841E−02 | 5.6982E−02 | 5.2108E−02 |
| A8 = 7.3102E−03 | 1.8051E−02 | −1.0420E−02 | −1.4076E−02 |
| A10 = −9.3557E−04 | −2.6924E−03 | 1.3622E−03 | 2.2274E−03 |
| A12 = 9.6775E−05 | 2.1685E−04 | −1.1826E−04 | −1.9785E−04 |
| A14 = −5.1374E−06 | −7.1614E−06 | 5.8680E−06 | 9.2044E−06 |
| A16 = — | — | −1.2376E−07 | −1.7520E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.39 | Dr1r6/CT4 | 1.28 |
| Fno | 2.40 | f2/|f1| | 0.09 |
| HFOV [deg.] | 47.5 | R12/f | 2.27 |
| V2/V3 | 2.38 | (|R13| + |R14|)/f | 0.56 |
| V3 + V5 | 47.0 | R14/f | 0.24 |
| CT2/CT1 | 1.39 | TL/ImgH | 1.49 |
| CT4/CT5 | 2.83 | |f/f1| + |f/f2| | 0.87 |
| ΣCT/Td | 0.72 | |Powmax| | 0.94 |

8th Embodiment

Figure 15:
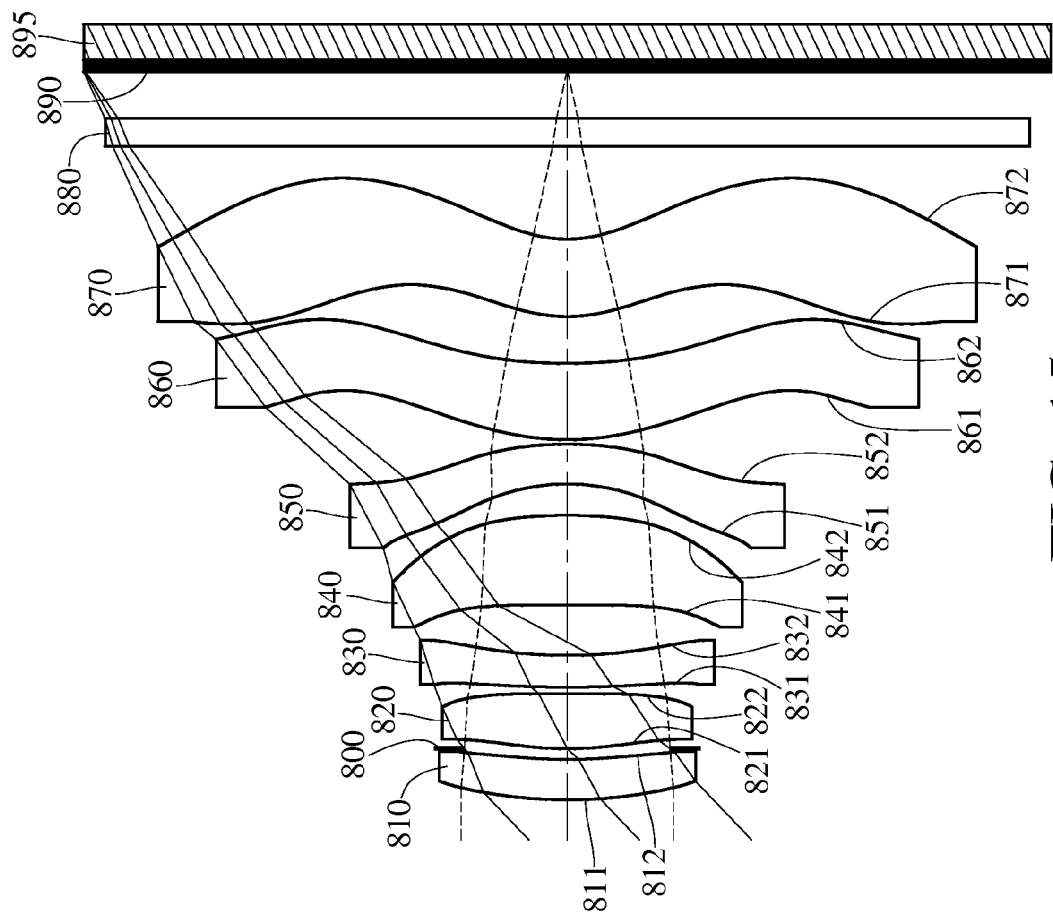
FIG. 15 is a schematic view of an image capturing unit according to the 7th embodiment of the present disclosure.
Figure 16:
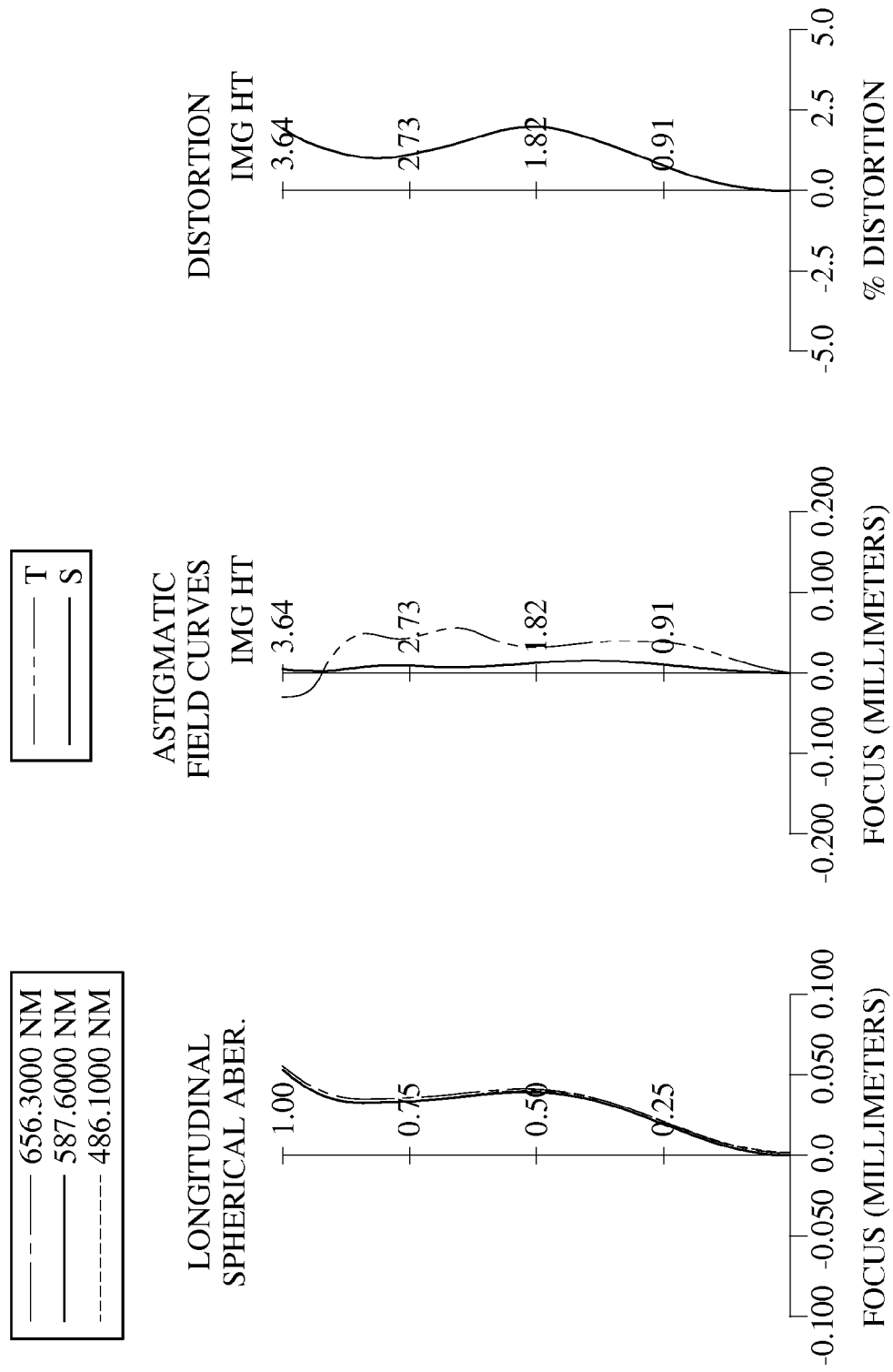
FIG. 16 shows spherical aberration curves, astigmatic field curves and a distortion curve of the image capturing unit according to the 7th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 895. The photographing optical lens assembly includes, in order from an object side to an image side, a first lens element 810, an aperture stop 800, a second lens element 820, a third lens element 830, a fourth lens element 840, a fifth lens element 850, a sixth lens element 860, a seventh lens element 870, an IR-cut filter 880 and an image surface 890, wherein the photographing optical lens assembly has a total of seven single and non-cemented lens elements (810-870).

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. A center of the image-side surface 842 of the fourth lens element 840 is a point closest to the image surface 890 on the image-side surface 842.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one convex shape in an off-axis region thereof.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The image-side surface 872 of the seventh lens element 870 has at least one convex shape in an off-axis region thereof.

The IR-cut filter 880 is made of glass and located between the seventh lens element 870 and the image surface 890, and will not affect the focal length of the photographing optical lens assembly. The image sensor 895 is disposed on or near the image surface 890 of the photographing optical lens assembly.

The detailed optical data of the 8th embodiment are shown in Table 15 and the aspheric surface data are shown in Table 16 below.

TABLE 15

8th Embodiment
f = 3.71 mm, Fno = 2.32, HFOV = 43.7 deg.

| Surface # | | Curvature Radius | Thickness | Material | Index | Abbe # | Focal Length |
|---|---|---|---|---|---|---|---|
| 0 | Object | Plano | Infinity | | | | |
| | Lens 1 | 3.316 (ASP) | 0.305 | Plastic | 1.544 | 55.9 | 356.04 |
| | | 3.265 (ASP) | 0.083 | | | | |
| 1 | Ape. Stop | Plano | −0.002 | | | | |
| 2 | Lens 2 | 2.287 (ASP) | 0.415 | Plastic | 1.544 | 55.9 | 4.21 |
| 3 | | 1010.131 (ASP) | 0.050 | | | | |
| 4 | Lens 3 | 8.359 (ASP) | 0.240 | Plastic | 1.639 | 23.5 | −10.16 |
| 5 | | 3.614 (ASP) | 0.381 | | | | |
| 6 | Lens 4 | −191.253 (ASP) | 0.677 | Plastic | 1.544 | 55.9 | 7.55 |
| 7 | | −4.026 (ASP) | 0.237 | | | | |
| 8 | Lens 5 | −1.585 (ASP) | 0.300 | Plastic | 1.639 | 23.5 | −5.21 |
| 9 | | −3.249 (ASP) | 0.035 | | | | |
| 10 | Lens 6 | 1.994 (ASP) | 0.576 | Plastic | 1.544 | 55.9 | 6.63 |
| | | 4.003 (ASP) | 0.353 | | | | |
| | Lens 7 | 1.111 (ASP) | 0.585 | Plastic | 1.535 | 55.7 | 74.64 |
| 11 | | 0.933 (ASP) | 0.700 | | | | |
| 12 | IR-cut filter | Plano | 0.210 | Glass | 1.517 | 64.2 | — |

TABLE 15-continued

8th Embodiment
f = 3.71 mm, Fno = 2.32, HFOV = 43.7 deg.

| Surface # | | Curvature Radius | Thickness | Material | Index | Abbe # | Focal Length |
|---|---|---|---|---|---|---|---|
| 13 | | Plano | 0.355 | | | | |
| 14 | Image | Plano | — | | | | |

Note:
Reference wavelength (d-line) is 587.6 nm.

TABLE 16

Aspheric Coefficients

| Surface # | | | | | |
|---|---|---|---|---|---|
| | 1 | 2 | 4 | 5 | 6 |
| k = | −4.5993E+00 | −3.5368E+01 | −1.3146E+01 | −9.0000E+01 | 3.5836E+01 |
| A4 = | −2.1717E−02 | −1.0442E−01 | −1.1771E−01 | −7.2834E−02 | −1.9220E−02 |
| A6 = | 5.0195E−02 | 1.1736E−01 | 8.4213E−02 | −9.6357E−02 | −1.2768E−02 |
| A8 = | −3.9178E−02 | 1.0130E−02 | −1.2326E−01 | 1.1864E−01 | 1.4077E−02 |
| A10 = | 1.8990E−02 | −1.4450E−01 | 3.0101E−02 | −8.4602E−02 | −3.7159E−02 |
| A12 = | 1.3048E−02 | 2.2108E−01 | 2.0957E−01 | 2.1261E−02 | 1.7553E−02 |
| A14 = | −5.8158E−03 | −9.3674E−02 | −2.1026E−01 | −3.2557E−02 | −1.2925E−02 |

| Surface # | | | | | |
|---|---|---|---|---|---|
| | 7 | 8 | 9 | 10 | 11 |
| k = | −3.8872E+00 | −9.0000E+01 | 6.9824E+00 | 1.2645E−01 | −5.1870E−01 |
| A4 = | 2.6425E−03 | −6.5187E−02 | −6.6191E−02 | −1.5941E−02 | −1.8582E−01 |
| A6 = | −6.2129E−03 | −1.6657E−02 | −2.0395E−01 | −9.1589E−02 | 2.0623E−01 |
| A8 = | −9.9116E−03 | −1.8606E−02 | 4.0852E−01 | 3.9890E−01 | −8.1693E−02 |
| A10 = | −5.1902E−03 | −5.8668E−03 | −3.8929E−01 | −3.4339E−01 | 1.7728E−02 |
| A12 = | 7.4777E−06 | 1.3548E−02 | 2.3497E−01 | 1.2792E−01 | −2.7354E−03 |
| A14 = | — | — | −8.9658E−02 | −1.8336E−02 | 2.6765E−04 |
| A16 = | — | — | 1.6139E−02 | — | — |

| Surface # | | | |
|---|---|---|---|
| | 12 | 13 | 14 | 15 |
| k = | −8.3116E+00 | −2.6560E+00 | −2.4676E+00 | −2.2340E+00 |
| A4 = | 4.9275E−02 | 4.8488E−02 | −1.7910E−01 | −1.4165E−01 |
| A6 = | −3.3421E−02 | −3.1868E−02 | 5.2217E−02 | 5.7886E−02 |
| A8 = | 8.2702E−03 | 7.3787E−03 | −9.5043E−03 | −1.6095E−02 |
| A10 = | −1.7706E−03 | −1.0663E−03 | 1.3462E−03 | 2.7610E−03 |
| A12 = | 2.8374E−04 | 9.7553E−05 | −1.3658E−04 | −2.7706E−04 |
| A14 = | −1.8751E−05 | −3.9964E−06 | 8.1666E−06 | 1.4908E−05 |
| A16 = | — | — | −2.0921E−07 | −3.3183E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.71 | Dr1r6/CT4 | 1.61 |
| Fno | 2.32 | f2/|f1| | 0.01 |
| HFOV [deg.] | 43.7 | R12/f | 1.08 |
| V2/V3 | 2.38 | (|R13| + |R14|)/f | 0.55 |

-continued

| 8th Embodiment | | | |
|---|---|---|---|
| V3 + V5 | 47.0 | R14/f | 0.25 |
| CT2/CT1 | 1.36 | TL/ImgH | 1.51 |
| CT4/CT5 | 2.26 | |f/f1| + |f/f2| | 0.89 |
| ΣCT/Td | 0.73 | |Powmax| | 0.88 |

The foregoing image capturing unit is able to be installed in, but not limited to, an electronic device, including smart phones, tablet personal computers and wearable apparatus. According to the present disclosure, the photographing optical lens assembly has a total of seven lens elements, and the image-side surface of the seventh lens element is concave in a paraxial region thereof. When specific conditions are satisfied, the image-side surface of the seventh lens element is favorable for effectively reducing the back focal length of the photographing optical lens assembly so as to maintain a compact size thereof. Moreover, it is favorable for the principal point of the photographing optical lens assembly being positioned away from the image side of the photographing optical lens assembly so as to reduce the track length of the photographing optical lens assembly. Furthermore, the refractive power distribution at the image side of the photographing optical lens assembly is sufficient so that it is favorable for providing wide field of view, low sensitivity and compact size. According to the disclosure, the photographing optical lens assembly simultaneously satisfies the requirements of compact size and high image quality.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
   a first lens element;
   a second lens element having positive refractive power;
   a third lens element;
   a fourth lens element;
   a fifth lens element;
   a sixth lens element with positive refractive power having both of an object-side surface and an image-side surface being aspheric; and
   a seventh lens element having an image-side surface being concave in a paraxial region thereof, wherein the image-side surface of the seventh lens element has at least one convex shape in an off-axis region thereof, and both of an object-side surface and the image-side surface of the seventh lens element are aspheric;
   wherein the photographing optical lens assembly has a total of seven lens elements; the first lens element, the second lens element, the third lens element, the fourth lens element, the fifth lens element, the sixth lens element and the seventh lens element are all single and non-cemented lens elements;
   wherein a curvature radius of the image-side surface of the sixth lens element is R12, a curvature radius of the image-side surface of the seventh lens element is R14, a focal length of the photographing optical lens assembly is f, a focal length of the first lens element is f1, a focal length of the second lens element is f2, an axial distance between an object-side surface of the first lens element and an image surface is TL, a maximum image height of the photographing optical lens assembly is ImgH, and the following conditions are satisfied:

$0 \leq R12/f$;

$f2/|f1|<1.5$;

$R14/f<0.75$; and $TL/ImgH<3.0$.

2. The photographing optical lens assembly of claim 1, wherein the image-side surface of the sixth lens element is concave in a paraxial region thereof, and the image-side surface of the sixth lens element has at least one convex shape in an off-axis region thereof.

3. The photographing optical lens assembly of claim 2, wherein a central thickness of the fourth lens element is CT4, a central thickness of the fifth lens element is CT5, and the following condition is satisfied:

$1.25<CT4/CT5<4.0$.

4. The photographing optical lens assembly of claim 2, wherein a maximum refractive power among the first lens element, the second lens element, the third lens element, the fourth lens element, the fifth lens element, the sixth lens element and the seventh lens element is Powmax, and the following condition is satisfied:

$|Powmax|<0.90$.

5. The photographing optical lens assembly of claim 1, wherein a sum of central thicknesses of the first lens element, the second lens element, the third lens element, the fourth lens element, the fifth lens element, the sixth lens element and the seventh lens element is $\Sigma CT$, an axial distance between the object-side surface of the first lens element and the image-side surface of the seventh lens element is Td, and the following condition is satisfied:

$0.70 \leq \Sigma CT/Td<0.95$.

6. The photographing optical lens assembly of claim 1, wherein the curvature radius of the image-side surface of the seventh lens element is R14, the focal length of the photographing optical lens assembly is f, and the following condition is satisfied:

$R14/f<0.60$.

7. The photographing optical lens assembly of claim 6, wherein the curvature radius of the image-side surface of the seventh lens element is R14, the focal length of the photographing optical lens assembly is f, and the following condition is satisfied:

$R14/f<0.45$.

8. The photographing optical lens assembly of claim 1, wherein a curvature radius of the object-side surface of the seventh lens element is R13, the curvature radius of the image-side surface of the seventh lens element is R14, the focal length of the photographing optical lens assembly is f, and the following condition is satisfied:

$(|R13|+|R14|)/f<2.0$.

9. The photographing optical lens assembly of claim 1, wherein a central thickness of the first lens element is CT1, a central thickness of the second lens element is CT2, and the following condition is satisfied:

$CT2/CT1<1.60$.

10. The photographing optical lens assembly of claim 1, wherein a center of an image-side surface of the fourth lens element is a point closest to the image surface on the image-side surface of the fourth lens element.

11. The photographing optical lens assembly of claim 1, wherein an axial distance between the object-side surface of the first lens element and an image-side surface of the third lens element is Dr1r6, a central thickness of the fourth lens element is CT4, and the following condition is satisfied:

$Dr1r6/CT4<2.50$.

12. The photographing optical lens assembly of claim 1, wherein an Abbe number of the third lens element is V3, an Abbe number of the fifth lens element is V5, and the following condition is satisfied:

$$V3+V5<60.$$

13. The photographing optical lens assembly of claim 1, wherein the focal length of the photographing optical lens assembly is f, the focal length of the first lens element is f1, the focal length of the second lens element is f2, and the following condition is satisfied:

$$|f/f1|+|f/f2|<1.50.$$

14. The photographing optical lens assembly of claim 1, wherein an Abbe number of the second lens element is V2, an Abbe number of the third lens element is V3, and the following condition is satisfied:

$$1.5<V2/V3<3.5.$$

15. The photographing optical lens assembly of claim 14, wherein the third lens element has negative refractive power, the fourth lens element has positive refractive power.

16. The photographing optical lens assembly of claim 14, wherein the fourth lens element has an image-side surface being convex in a paraxial region thereof.

17. The photographing optical lens assembly of claim 1, wherein the object-side surface of the seventh lens element is convex in a paraxial region thereof.

18. The photographing optical lens assembly of claim 1, wherein the focal length of the first lens element is f1, the focal length of the second lens element is f2, and the following condition is satisfied:

$$f2/|f1|<1.0.$$

19. An image capturing unit, comprising:
the photographing optical lens assembly of claim 1; and
an image sensor, wherein the image sensor is disposed on the image side of the photographing optical lens assembly.

20. An electronic device, comprising:
the image capturing unit of claim 19.

* * * * *